US012693469B2

(12) United States Patent
Tandon et al.

(10) Patent No.: US 12,693,469 B2
(45) Date of Patent: Jul. 28, 2026

(54) UNCOUPLED-CORE MULTICORE OPTICAL FIBER WITH REDUCED CROSS TALK

(71) Applicant: CORNING INCORPORATED, Corning, NY (US)

(72) Inventors: Pushkar Tandon, Painted Post, NY (US); Aramais Robert Zakharian, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 312 days.

(21) Appl. No.: 18/235,496

(22) Filed: Aug. 18, 2023

(65) Prior Publication Data

US 2024/0069271 A1     Feb. 29, 2024

Related U.S. Application Data

(60) Provisional application No. 63/464,270, filed on May 5, 2023, provisional application No. 63/446,619, filed
(Continued)

(51) Int. Cl.
G02B 6/02 (2006.01)
G02B 6/028 (2006.01)
G02B 6/036 (2006.01)

(52) U.S. Cl.
CPC ..... *G02B 6/02042* (2013.01); *G02B 6/02019* (2013.01); *G02B 6/0281* (2013.01); *G02B 6/03622* (2013.01)

(58) Field of Classification Search
None
See application file for complete search history.

(56) References Cited

U.S. PATENT DOCUMENTS 10,031,285 B2 * 7/2018 Nakanishi .......... G02B 6/02214
11,370,689 B2 6/2022 Khrapko
(Continued)

FOREIGN PATENT DOCUMENTS

CN 103547953 A * 1/2014 .......... G02B 6/0288
CN 104678484 A * 6/2015 ............ C03B 37/02
(Continued)

OTHER PUBLICATIONS

International Search Report and Written Opinion of the International Searching Authority; PCT/US2023/030654; dated Nov. 17, 2023; 12 pages; European Patent Office.
(Continued)

*Primary Examiner* — Chris H Chu
(74) *Attorney, Agent, or Firm* — Kevin L. Bray

(57) ABSTRACT

An uncoupled-core multicore optical fiber is disclosed, the fiber including at least two core portions, each core portion including a core and a depressed-index cladding. The core having a radius $r_1$ and a relative refractive index $\Delta_1$. The depressed-index cladding having a radius $r_2$ and a relative refractive index $\Delta_2$, the depressed-index cladding surrounding and directly contacting the core, a volume $V_2$ of the depressed-index cladding being about 15.0% $\Delta$-micron$^2$ to about 37.0% $\Delta$-micron$^2$. The fiber further includes a common cladding having a radius $r_3$ and a relative refractive index $\Delta_3$ such that $\Delta_2 < \Delta_3 < \Delta_1$, the common cladding surrounding and directly contacting the depressed-index cladding. Furthermore, a cable cutoff wavelength of each core portion is about 1530 nm or less and a center-to-center spacing between centerlines of adjacent core portions is about 48 microns to about 60 micron.

17 Claims, 11 Drawing Sheets

Related U.S. Application Data on Feb. 17, 2023, provisional application No. 63/401,310, filed on Aug. 26, 2022.

(56)                References Cited

U.S. PATENT DOCUMENTS

| | | | | |
|---|---|---|---|---|
| 2013/0243381 A1* | 9/2013 | Hayashi | .............. | G02B 6/02266 |
| | | | | 385/124 |
| 2020/0110217 A1* | 4/2020 | Bigot | ................. | H04B 10/2581 |
| 2021/0181408 A1* | 6/2021 | Bickham | ............ | G02B 6/03627 |
| 2021/0294027 A1 | 9/2021 | Bennett et al. | | |
| 2021/0294029 A1* | 9/2021 | Bickham | ............ | G02B 6/02009 |
| 2022/0026629 A1 | 1/2022 | Tandon et al. | | |
| 2022/0043201 A1 | 2/2022 | Bickham et al. | | |
| 2023/0341618 A1 | 10/2023 | Matsui et al. | | |

FOREIGN PATENT DOCUMENTS

| | | |
|---|---|---|
| EP | 4198585 A1 | 6/2023 |
| WO | 2022/034662 A1 | 2/2022 |
| WO | 2022/065435 A1 | 3/2022 |

OTHER PUBLICATIONS

Mercy Kingsta et al., "A review on coupled and uncoupled multicore fibers for future ultra-high capacity optical communication", Optik, vol. 199, Aug. 31, 2019, pp. 3-4.

Akihide Sano et al., "Crosstalk-Managed High Capacity Long Haul Multicore Fiber Transmission With Propagation-Direction Interleaving", Journal of Lightwave Technology, 2014, vol. 32, No. 16, pp. 2771-2779.

Dar et al., "Submarine Cable Cost Reduction Through Massive SDM", European Conference on Optical Communication, 2017, pp. 1-3.

Desbruslais, "Maximizing the Capacity of Ultra-Long Haul Submarine Systems", 20th European Conference on Networks and Optical Communications, 2015, pp. 1-6.

Lukasz Szostkiewicz, et al., "Cross talk analysis in multicore optical fibers by supermode theory", Optics Letters, 2016, vol. 41, No. 16, pp. 3759-3762.

M. Koshiba, et al., "Analytical Expression of Average Power-Coupling Coefficients for Estimating Intercore Crosstalk in Multicore fibers", IEEE Photonics J., 2012, vol. 4, No. 5, pp. 1987-1995.

M. Li, et al., "Coupled Mode Analysis of Crosstalk in Multicore fiber with Random Perturbations", in Optical Fiber Communication Conference, OSA Technical Digest (online), Optical Society of America, 2015, paper W2A.35, pp. 1-3.

Pecci, Kamalov, Du, OFC panel Discussion on "Will SDM Truly Revolutionize the Submarine Communication Industry?",2019, Retreived from: https://www.ofcconference.org/en-us/home/program-speakers/panel/sdm-truly-revolutionize/.

Shoichiro Matsuo, et al., "Crosstalk behavior of cores in multi-core portion under bent condition", IEICE Electronics Express, 2011, vol. 8, No. 6, pp. 385-390.

Sinkin et al., "SDM Concepts for Submarine Transmission", Advanced Photonics Congress, paper,-NeTh2B.1, 2017.

Soma et al., "50.47-Tbit/s Standard Cladding Coupled 4-Core Fiber Transmission Over 9,150 km", Journal of Lightwave Technology, 2021, vol. 39, No. 22, pp. 7099-7105.

T. Hayashi, et al., "Physical Interpretation of Intercore Crosstalk in Multicore fiber: Effects of Macrobend, Structure Fluctuation, and Microbend", Optics Express, 2013, vol. 21, No. 5, pp. 5401-5412.

Tetsuya Hayashi et al., "Uncoupled Multi-Core Fiber Design for Practical Bidirectional Optical Communications", OFC, Optica Publishing Group, 2022, pp. 1-3.

* cited by examiner

CENTER-TO-CENTER SPACING OF ADJACENT CORES (microns)

UNCOUPLED-CORE MULTICORE OPTICAL FIBER WITH REDUCED CROSS TALK

This application claims the benefit of priority under 35 U.S.C § 120 of U.S. Provisional Application Ser. No. 63/464,270 filed on May 5, 2023, and claims the benefit of priority of U.S. Provisional Application Ser. No. 63/446,619 filed on Feb. 17, 2023, and claims the benefit of priority of U.S. Provisional Application Ser. No. 63/401,310 filed on Aug. 26, 2022, the contents of which are relied upon and incorporated herein by reference in their entirety.

FIELD OF THE DISCLOSURE

This disclosure pertains to multicore optical fibers. More particularly, this disclosure pertains to uncoupled-core multicore optical fibers with reduced cross talk between adjacent cores such that the cores are alkali doped.

BACKGROUND OF THE DISCLOSURE

Multicore optical fibers include a plurality of cores embedded in a cladding matrix. Therefore, the fiber density is increased, making multicore fibers beneficial to overcome cable size limitations and duct congestion issues in passive optical network ("PON") systems. The use of multicore optical fibers is also beneficial in submarine cables, which are designed to carry telecommunication signals across stretches of land and ocean. Over the past several years, there has been a dramatic increase in the use of submarine cables to transmit telecommunications signals, with greater than ninety percent of inter-continental communication signals currently being transmitted over these cables. Thus, the demand for the transmission capacity of such submarine cables has increased, driven by the growth of internet traffic among different continents.

SUMMARY

The multicore optical fibers disclosed herein have low cross talk between adjacent cores and low dispersion, while still maintaining a sufficiently high mode field diameter. Thus, the multicore optical fibers disclosed herein may be beneficial for use in submarine cables. The multicore optical fibers disclosed herein may be referred to as uncoupled fibers due to the distance between the cores, which is large enough to ensure isolated mode transmission within the different cores. Furthermore, the multicore optical fibers disclosed herein have alkali doped cores enclosed by a trench, which not only minimizes cross talk but also reduces radiation loss In aspects, the present disclosure includes an uncoupled-core multicore optical fiber, the fiber comprising at least two core portions, each core portion comprising a core and a depressed-index cladding. The core having a radius $r_1$ and a relative refractive index $\Delta_1$ relative to pure silica, the core being doped with at least one of sodium, potassium, and rubidium. The depressed-index cladding having a radius $r_2$ and a relative refractive index $\Delta_2$ relative to pure silica such that $\Delta_2 < \Delta_1$, the depressed-index cladding surrounding and directly contacting the core, a volume $V_2$ of the depressed-index cladding being about 15.0% $\Delta$-micron$^2$ to about 37.0% $\Delta$-micron$^2$. The fiber further comprises a common cladding having a radius $r_3$ and a relative refractive index $\Delta_3$ relative to pure silica such that $\Delta_2 < \Delta_3 < \Delta_1$, the common cladding surrounding and directly contacting the depressed-index cladding. Furthermore, a cable cutoff wavelength of each core portion is about 1530 nm or less, an effective area of each core portion is about 100 micron$^2$ to about 135 micron$^2$ at a wavelength of 1550 nm, attenuation of the multicore optical fiber at a wavelength of 1550 nm is about 0.165 dB/km or less, and a center-to-center spacing between centerlines of adjacent core portions is about 48 microns to about 60 micron.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
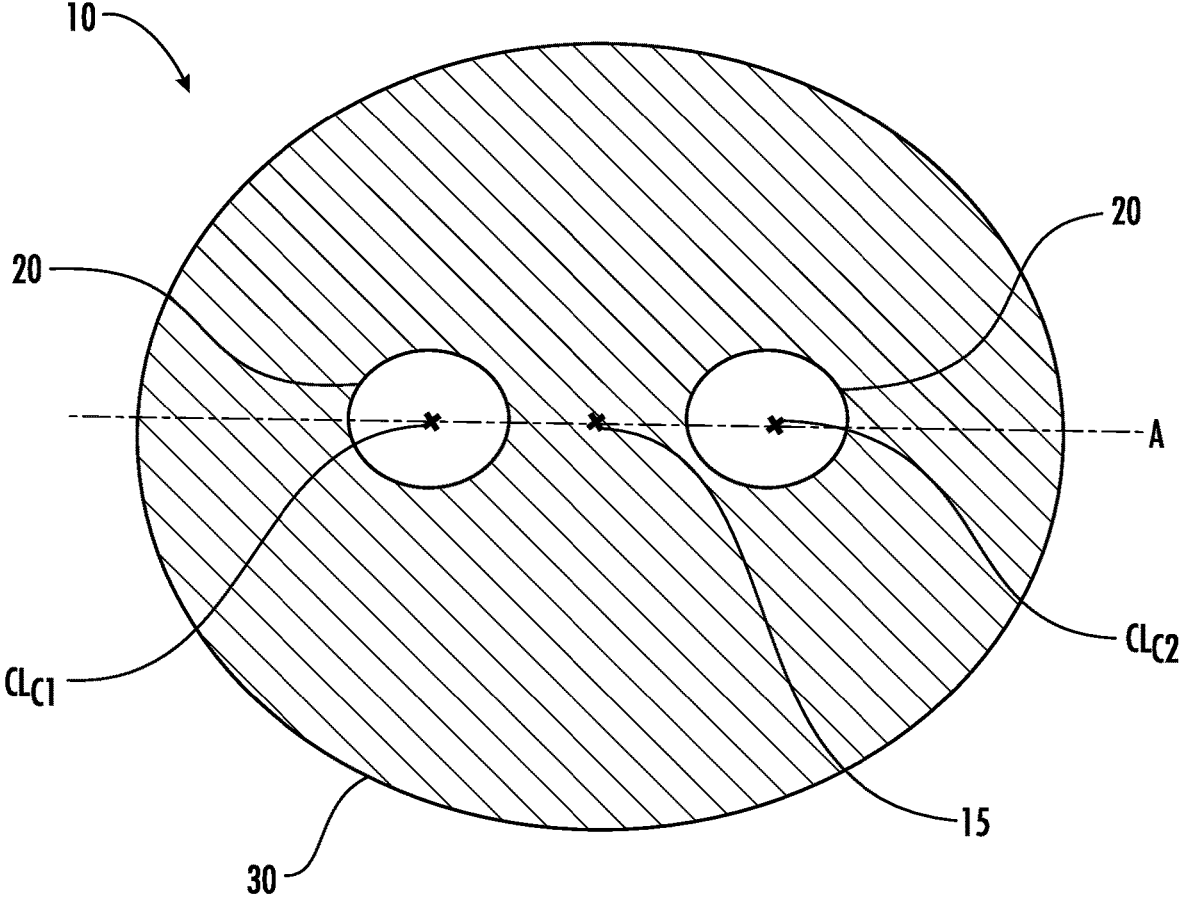
FIG. 1 is a schematic view of a cross-section of an uncoupled-core multicore optical fiber with a plurality of cores according to embodiments of the present disclosure.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification and in the claims which follow, reference will be made to a number of terms which shall be defined to have the following meanings:

"Optical fiber" refers to a waveguide having a glass portion surrounded by a coating. The glass portion includes a core and a cladding and is referred to herein as a "glass fiber".

"Radial position", "radius", or the radial coordinate "r" refers to radial position relative to the centerline (r=0) of the fiber.

"Refractive index" refers to the refractive index at a wavelength of 1550 nm, unless otherwise specified.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When a relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or as a parameter (e.g. $\Delta$ or $\Delta\%$) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value of relative refractive index in the region as defined below, unless otherwise specified. Whether by design or a consequence of normal manufacturing variability, the dependence of relative refractive index on radial position may be sloped, curved, or otherwise non-constant.

"Relative refractive index," as used herein, is defined as:

$$\Delta_i(r_i)\% = 100\frac{\left(n_i^2 - n_{ref}^2\right)}{2n_i^2}$$

where $n_i$ is the refractive index at radial position $r_i$ in the glass fiber, unless otherwise specified, and $n_{ref}$ is the refractive index of pure silica glass, unless otherwise specified. Accordingly, as used herein, the relative refractive index percent is relative to pure silica glass, which has a value of 1.444 at a wavelength of 1550 nm. As used herein, the relative refractive index is represented by $\Delta$ (or "delta") or $\Delta\%$ (or "delta %") and its values are given in units of "%", unless otherwise specified. Relative refractive index may also be expressed as $\Delta(r)$ or $\Delta(r)$ %.

The average relative refractive index ($\Delta_{ave}$) of a region of the fiber is determined from the following equation:

$$\Delta_{ave} = \int_{r_{inner}}^{r_{outer}} \frac{\Delta(r)dr}{(r_{outer} - r_{inner})}$$

where $r_{inner}$ is the inner radius of the region, router is the outer radius of the region, and $\Delta(r)$ is the relative refractive index of the region.

The refractive index of an optical fiber profile may be measured using commercially available devices, such as the IFA-100 Fiber Index Profiler (Interfiber Analysis LLC, Sharon, MA USA) or the S14 Refractive Index Profiler (Photon Kinetics, Inc., Beaverton, OR USA). These devices measure the refractive index relative to a measurement reference index, $n(r)-n_{meas}$, where the measurement reference index $n_{meas}$ is typically a calibrated index matching oil or pure silica glass. The measurement wavelength may be 632.5 nm, 654 nm, 677.2 nm, 654 nm, 702.3 nm, 729.6 nm, 759.2 nm, 791.3 nm, 826.3 nm, 864.1 nm, 905.2 nm, 949.6 nm, 997.7 nm, 1050 nm, or any wavelength therebetween. The absolute refractive index $n(r)$ is then used to calculate the relative refractive index as defined above.

The term "$\alpha$-profile" or "alpha profile" refers to a relative refractive index profile $\Delta(r)$ that has the functional form defined in the following equation:

$$\Delta(r) = \Delta(r_0)\left[1 - \left[\frac{|r - r_0|}{(r_z - r_0)}\right]^\alpha\right]$$

where $r_o$ is the radial position at which $\Delta(r)$ is maximum, $\Delta(r_0)>0$, $r_z>r_0$ is the radial position at which $\Delta(r)$ decreases to its minimum value, and r is in the range $r_i \leq r \leq r_f$, where $r_i$ is the initial radial position of the $\alpha$-profile, $r_f$ is the final radial position of the $\alpha$-profile, and $\alpha$ is a real number. $\Delta(r_0)$ for an $\alpha$-profile may be referred to herein as $\Delta_{max}$ or, when referring to a specific region i of the fiber, as $\Delta_{imax}$. When the relative refractive index profile of the fiber core region is described by an $\alpha$-profile with $r_0$ occurring at the centerline (r=0), $r_z$ corresponding to the outer radius $r_1$ of the core region, and $\Delta_1(r_1)=0$, the above equation simplifies to:

$$\Delta_1(r) = \Delta_{1max}\left[1 - \left[\frac{r}{r_1}\right]^\alpha\right]$$

Figure 3:
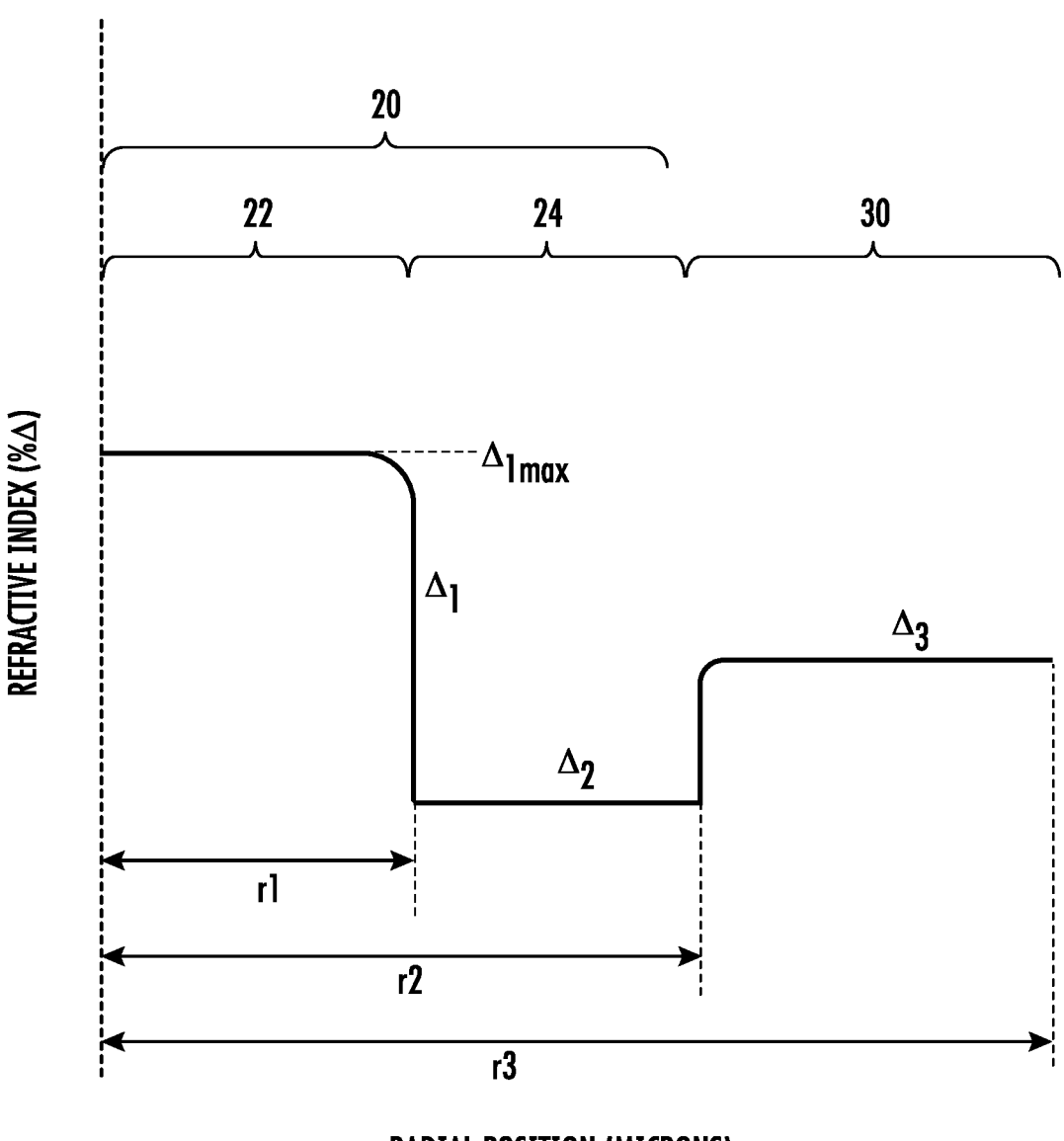
FIG. 3 depicts a relative refractive index profile of an uncoupled-core multicore optical fiber according to embodiments of the present disclosure.

When the core region has an index described by the above equation, the outer radius $r_1$ can be determined from the measured relative refractive index profile by the following procedure. Estimated values of the maximum relative refractive index $\Delta_{1max}$, $\alpha$, and outer radius $r_{1est}$ are obtained from inspection of the measured relative refractive index profile and used to create a trial function $\Delta_{trial}$ between $r=-r_{1est}$ and $r=r_{1est}$. A relative refractive index profile of a representative glass fiber having cores described by an $\alpha$-profile, in accordance with embodiments of the present disclosure, is shown in FIG. 3.

The term "graded-index profile" refers to an $\alpha$-profile, where $\alpha<10$. The term "step-index profile" refers to an $\alpha$-profile, where $\alpha\geq10$.

"Trench volume" is defined as:

$$V_{Trench} = \left| 2 \int_{r_{Trench,inner}}^{r_{Trench,outer}} \Delta_{Trench}(r) r \, dr \right|$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is in absolute value and a positive quantity and will be expressed herein in units of % $\Delta$micron$^2$, % $\Delta$-micron$^2$, % $\Delta$-$\mu$m$^2$, or % $\Delta\mu$m$^2$, whereby these units can be used interchangeably herein. A trench region is also referred to herein as a depressed-index cladding region and trench volume is also referred to herein as $V_2$.

The "mode field diameter" or "MFD" of an optical fiber is defined in the following equation as:

$$MFD = 2w$$

$$w^2 = 2 \frac{\int_0^\infty (f(r))^2 r \, dr}{\int_0^\infty \left(\frac{df(r)}{dr}\right)^2 r \, dr}$$

where f(r) is the transverse component of the electric field distribution of the guided optical signal and r is radial position in the fiber. "Mode field diameter" or "MFD" depends on the wavelength of the optical signal and is reported herein for wavelengths of 1310 nm, 1550 nm, and 1625 nm. Specific indication of the wavelength will be made when referring to mode field diameter herein. Unless otherwise specified, mode field diameter refers to the $LP_{01}$ mode at the specified wavelength.

"Effective area" of an optical fiber is defined in the following equation as:

$$A_{eff} = \frac{2\pi \left[ \int_0^\infty (f(r))^2 r \, dr \right]^2}{\int_0^\infty (f(r))^4 r \, dr}$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm.

The term "attenuation," as used herein, is the loss of optical power at a wavelength of 1550 nm as the signal travels along the optical fiber. Attenuation was measured as specified by the IEC-60793-1-40 standard, "Attenuation measurement methods."

The bend resistance of an optical fiber, expressed as "bend loss" herein, can be gauged by induced attenuation under prescribed test conditions as specified by the IEC-60793-1-47:2017 standard, "Optical fibres—Part 1-47: Measurement methods and test procedures—Macrobending loss." For example, the test condition can entail deploying or wrapping the fiber around a mandrel of a prescribed diameter, e.g., by wrapping 100 turns around a 60 mm diameter mandrel and measuring the increase in attenuation per turn.

"Cable cutoff wavelength," or "cable cutoff," as used herein, refers to the 22 m cable cutoff test as specified by the IEC 60793-1-44 standard, "Measurement methods and test procedures—Cut-off wavelength."

Unless otherwise noted herein, optical properties (such as dispersion, dispersion slope, etc.) are reported for the LP01 mode.

"Chromatic dispersion," herein referred to as "dispersion" unless otherwise noted, of an optical fiber is the sum of the material dispersion, the waveguide dispersion, and the inter-modal dispersion. "Material dispersion" refers to the manner in which the refractive index of the material used for the optical core affects the velocity at which different optical wavelengths propagate within the core. "Waveguide dispersion" refers to dispersion caused by the different refractive indices of the core and cladding of the optical fiber. In the case of single mode waveguide fibers, the inter-modal dispersion is zero. Dispersion values in a two-mode regime assume intermodal dispersion is zero. The zero-dispersion wavelength ($\lambda_0$) is the wavelength at which the dispersion has a value of zero. Dispersion slope is the rate of change of dispersion with respect to wavelength. Dispersion and dispersion slope are reported herein at a wavelength of 1310 nm or 1550 nm, as noted, and are expressed in units of ps/nm/km and ps/nm$^2$/km, respectively. Chromatic dispersion is measured as specified by the IEC 60793-1-42:2013 standard, "Optical fibres—Part 1-42: Measurement methods and test procedures—Chromatic dispersion."

The term "cross talk" in a multicore optical fiber is a measure of how much power leaks from one core portion to an adjacent core portion. As used herein, the term "adjacent core portion" refers to the core that is nearest to the reference core portion. In embodiments, all core portions may be equally spaced from one another, meaning that all core portions are adjacent one another. In other embodiments, the core portions may not be equally spaced from one another, meaning that some core portions are spaced further from the reference core portion than adjacent core portions are spaced from the reference core portion. The cross talk can be determined based on the coupling coefficient, which depends on the refractive index profile design of the core portion, the distance between the two adjacent core portions, the structure of the cladding surrounding the two adjacent core portions, and $\Delta\beta$, which depends on a difference in propagation constant $\beta$ values between the two adjacent core portions (e.g., as described herein, two core portions having centerlines separated by a minimum core-to-core separation distance). For two adjacent core portions with power $P_1$ launched into the first core portion, then the power $P_2$ coupled from the first core portion to the second core portion can be determined from coupled mode theory using the following equation:

$$P_2 = \frac{L}{L_c} \left\{ \left(\frac{\kappa}{g}\right)^2 \sin^2(g\Delta L) \right\} P_1$$

where < > denotes the average, L is fiber length, K is the coupling coefficient between the electric fields of the two cores, $\Delta L$ is the length of the fiber, $L_c$ is the correlation length, and g is given by the following equation:

$$g^2 = \kappa^2 + \left(\frac{\Delta\beta}{2}\right)^2$$

where $\Delta\beta$ is the mismatch in propagation constants between the LP01 modes in the two adjacent core portions when they are isolated. The cross talk (in dB) is then determined using the following equation:

$$X = 10\log\left(\frac{P_2}{P_1}\right) = 10\log\left(\frac{L}{L_c}\left[\left(\frac{\kappa}{g}\right)^2 \sin^2(g\Delta L)\right]\right)$$

The cross talk between the two adjacent core portions increases linearly with fiber length in the linear scale but does not increase linearly with fiber length in the dB scale. As used herein, cross talk performance is referenced to a 100 km length L of optical fiber. However, cross talk performance can also be represented with respect to alternative optical fiber lengths, with appropriate scaling. For optical fiber lengths other than 100 km, the cross talk between core portions can be determined using the following equation:

$$X(L) = X(100) + 10\log\left(\frac{L}{100}\right)$$

For example, for a 10 km length of optical fiber, the cross talk can be determined by adding "−10 dB" to the cross talk value for a 100 km length optical fiber. For a 1 km length of optical fiber, the cross talk can be determined by adding "−20 dB" to the crosstalk value for a 100 km length of optical fiber. For long-haul transmission in an uncoupled-core multicore fiber, the cross talk per 100 km length should be less than or equal to −30 dB, less than or equal to −40 dB, or even less than or equal to −50 dB.

As used herein, with co-propagating cross talk (XT) the power $P_1$ is launched into the first core portion, as described above, at a first end of the optical fiber and the power $P_2$ coupled into the second core portion is determined at a second end of the optical fiber. Therefore, the power $P_2$ coupled into the second core portion is determined at the end of the optical fiber in the propagating direction of the optical signal. As used herein, with counter-propagating cross talk (CXT) the power $P_1$ is launched into the first core portion, as described above, at a first end of the optical fiber and the power $P_2$ coupled into the second core portion is determined at the first end of the optical fiber. Therefore, the power $P_2$ coupled into the second core portion is determined at the end of the optical fiber that is opposite of the propagating direction of the optical signal. Counter-propagating cross talk is generally lower in an optical fiber than co-propagating cross talk.

Figure 9:
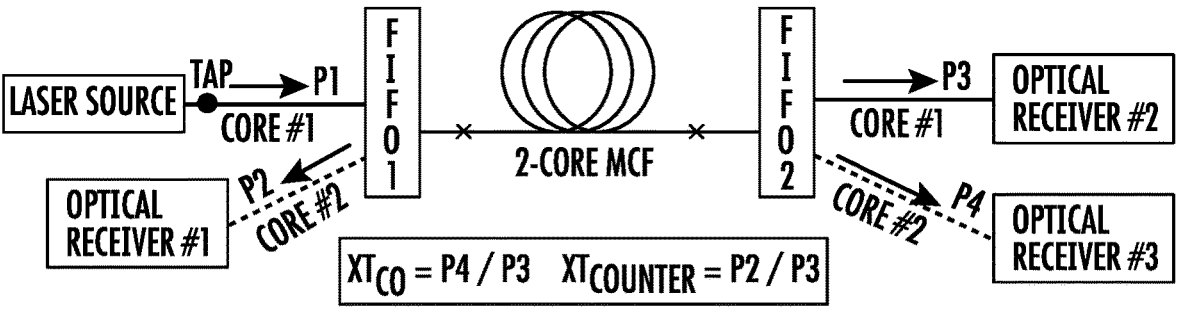
FIG. 9 is schematic drawing of a system to measure co-propagating cross talk and counter-propagating cross talk.

The system to measure co-propagating cross talk and counter-propagating cross talk, as disclosed herein, is shown in FIG. 9. In order to measure the disclosed cross talk, multicore fibers (e.g., multicore fiber with a 1×2 core design) with a length between 20 and 25 km on a standard shipping spool were tested. As shown in FIG. 9, the system comprises a tunable laser source (TLS) with a linewidth of 200 kHz, a tap to monitor the laser output power, and a 1×2 multicore fiber fan-in/fan-out (FIFO 1) spliced to the fiber to inject the source light into one core of the fiber while directing backward propagating light in the other core. A fan-out (FIFO 2) is spliced at the far end of the fiber, and its outputs are connected to optical receivers to measure forward propagating light out of each core. The optical receivers #1, #2, and #3, as shown in FIG. 9, are each a high sensitivity detector with −109 dBm noise sensitivity and linearity error with <20% deviation over the entire power measured range (+5 to −75 dBm). All three optical receivers were calibrated and read out the same power at one power level. The multicore fiber used to fabricate FIFOs had the same mode field diameter and core-to-core pitch as the transmission multicore fiber under test.

Techniques for determining cross talk between cores in a multicore optical fiber can also be found in M. Li, et al., "Coupled Mode Analysis of Crosstalk in Multicore fiber with Random Perturbations," in Optical Fiber Communication Conference, OSA Technical Digest (online), Optical Society ofAmerica, 2015, paper W2A.35, and Shoichiro Matsuo, et al., "Crosstalk behavior of cores in multi-core portion under bent condition," IEICE Electronics Express, Vol. 8, No. 6, p. 385-390, published Mar. 25, 2011 and Lukasz Szostkiewicz, et al., "Cross talk analysis in multicore optical fibers by supermode theory," Optics Letters, Vol. 41, No. 16, p. 3759-3762, published Aug. 15, 2016, the contents of which are all incorporated herein by reference in their entirety. Furthermore, techniques for determining co-propagating and counter-propagating cross talk between cores in a multicore optical fiber can be found in Akihide Sano et al., "Crosstalk-Managed High Capacity Long Haul Multicore Fiber Transmission With Propagation-Direction Interleaving," Journal of Lightwave Technology, Vol. 32, No. 16, p. 2771-2779, published Aug. 15, 2014 and Tetsuya Hayashi et al., "Uncoupled Multi-Core Fiber Design for Practical Bidirectional Optical Communications," OFC, Optica Publishing Group, 2022, which are also incorporated by reference in their entirety.

The phrase "coupling coefficient" x, as used herein, is related to the overlap of electric fields when the two cores are close to each other. The square of the coupling coefficient, $K^2$, is related to the average power in core m as influenced by the power in other cores in the multicore optical fiber. The "coupling coefficient" can be estimated using the coupled power theory, with the methods disclosed in M. Koshiba, K. Saitoh, K. Takenaga, and S. Matsuo, "Analytical Expression of Average Power-Coupling Coefficients for Estimating Intercore Crosstalk in Multicore fibers," IEEE Photonics J., 4(5), 1987-95 (2012); and T. Hayashi, T. Sasaki, E. Sasaoka, K. Saitoh, and M. Koshiba, "Physical Interpretation of Intercore Crosstalk in Multicore fiber: Effects of Macrobend, Structure Fluctuation, and Microbend," Optics Express, 21(5), 5401-12 (2013), the contents of which are incorporated by reference herein in their entirety.

The optical fibers disclosed herein include a plurality of core portions, an outer cladding region surrounding each core portion, and an optional coating surrounding the outer cladding region. The core portions and outer cladding regions are glass. Each core portion includes multiple regions including a core and a depressed-index cladding. The multiple core portions are preferably concentric regions. The depressed-index cladding surrounds and is directly adjacent to the core. The outer cladding region surrounds and is directly adjacent to the depressed-index cladding such that the depressed-index cladding is disposed between the core and the outer cladding region in a radial direction. As discussed further below, the outer cladding region is a common cladding.

The depressed-index cladding has a lower relative refractive index than each of the core and the outer cladding region. The depressed-index cladding may be referred to herein as a trench or trench region. Furthermore, as discussed further below, the depressed-index cladding contributes to a reduction in cross talk between adjacent cores.

Whenever used herein, radial position $r_1$ and relative refractive index $\Delta_1$ or $\Delta_1(r)$ refer to the core, radial position $r_2$ and relative refractive index $\Delta_2$ or $\Delta_2(r)$ refer to the depressed-index cladding, and radial position $r_3$ and relative refractive index $\Delta_3$ or $\Delta_3(r)$ refer to the outer cladding region. Additionally, a radial position $r_4$ (not shown) refers to a primary coating, radial position $r_5$ (not shown) refers to a secondary coating, and the radial position $r_6$ (not shown) refers to an optional tertiary coating.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\Delta_{3min}$. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the cores are each substantially cylindrical in shape and that the surrounding depressed-index claddings, outer cladding regions, primary coating, and secondary coating are substantially annular in shape. Annular regions are characterized in terms of an inner radius and an outer radius. Radial positions $r_1$, $r_2$, $r_3$, $r_4$, $r_5$, and $r_6$ refer herein to the outermost radii of a core region, a depressed-index cladding, an outer cladding region, a primary coating, a secondary coating, and a tertiary coating, respectively. The radius $r_5$ also corresponds to the outer radius of the optical fiber in embodiments without a tertiary coating. When a tertiary coating is present, the radius $r_6$ corresponds to the outer radius of the optical fiber.

The difference between radial position $r_2$ and radial position $r_1$ is the thickness of the depressed-index cladding. The difference between radial position $r_3$ and radial position $r_2$ is the thickness of the outer cladding region. The difference between radial position $r_4$ and radial position $r_3$ is the thickness of the primary coating. The difference between radial position $r_5$ and radial position $r_4$ is the thickness of the secondary coating.

Conventionally, multicore optical fibers can be used to increase fiber density while maintaining the outer diameter of a conventional optical fiber (e.g., 125 micron diameter). Furthermore, conventional approaches to achieve such high fiber densities with multicore optical fibers, while also reducing cross talk between adjacent cores, include reducing the mode field diameter of the multicore optical fiber. Although a reduction in mode field diameter reduces cross talk between adjacent cores, it also limits the amount of power that can be launched into each core due to non-linear effects. Therefore, conventional multicore optical fibers typically have increased radiation and tunneling losses.

The multicore optical fibers described herein address these deficiencies in the conventional approaches to providing high fiber density in relatively smaller (e.g., 125 micron outer diameter) multicore optical fibers. In particular, by incorporating core portions comprising a depressed-index cladding immediately adjacent to a core, the multicore optical fibers described herein have reduced radiation and tunneling losses while still maintaining a large effective area, relatively low cross talk, and good bending performance. Furthermore, the multicore optical fibers disclosed herein have mode field diameters that are compatible with standard single mode fibers.

In the embodiments disclosed herein, the multicore optical fibers are uncoupled. For uncoupled cores of a multicore optical fiber, the distance between the cores is large to ensure isolated mode transmission within the cores and low cross-talk between the cores. The cross talk between the cores of the uncoupled-core multicore optical fibers disclosed herein, at a wavelength of 1550 nm, is less than or equal to −30 dB per 100 km of length (−30 dB/100 km) of the multicore optical fiber. A multicore optical fiber having at least one pair of uncoupled cores is referred to herein as an "uncoupled-core multicore optical fiber." In contrast, coupled cores of multicore optical fibers take advantage of cross talk between the cores. As a result, in coupled multicore optical fibers, the distance between cores must be much smaller than in uncoupled multicore optical fibers.

The uncoupled-core multicore fibers disclosed herein comprise a common cladding region that encircles and directly contacts a core portion, and the core portion comprises a depressed-index cladding that encircles and directly contacts a core, wherein the common cladding region encircles and directly contacts the depressed-index cladding.

With reference to FIG. 1, embodiments of the present disclosure are directed to an uncoupled-core multicore optical fiber 10 that comprises a plurality of core portions 20 surrounded by a common cladding 30. In embodiments, fiber 10 is configured for use in a submarine cable. Core portions 20 of fiber 10 are each a glass core. As shown in FIG. 1, core portions 20 are disposed within common cladding 30 and generally extend for a length of fiber 10 parallel to central axis 15 of the fiber. Although FIG. 1 only depicts two core portions 20, it is noted that fiber 10 may comprise more than two core portions such as, for example, 2 or more, or 4 or more, or 6 or more, or 8 or more, or 10 or more, or 12 or more core portions. However, it is noted that in some embodiments, fiber 10 only comprises two core portions 20 that are uncoupled.

Common cladding 30 can also be referred to herein as a "glass matrix." An outer diameter of common cladding 30 is about 180 microns or less, or about 160 microns or less, or about 150 microns or less, or about 125 microns or less, or about 100 microns or less. In embodiments, the outer diameter of common cladding 30 is in a range from about 100 microns to about 180 microns, or from about 100 microns to about 160 microns, or from about 120 microns to about 130 microns, or from about 124 microns to about 126 microns. In some embodiments, the outer diameter of the outer cladding is 125 microns. The outer diameter of common cladding 30 may be the outer glass diameter of fiber 10. As shown in FIG. 1, common cladding 30 is circular in cross-section. However, it is also contemplated that common cladding 30 may comprise other cross-sectional shapes. Furthermore, in some embodiments and as discussed further below, an outer coating may surround common cladding 30.

Central axis 15 is at the centerline of fiber 10 and defines the radial position r=0 of fiber 10. Core portions 20 may be arranged such that a centerline of at least one core portion 20 and central axis 15 are positioned along the same axis. For example, as shown in FIG. 1, a centerline $CL_{Ci}$ (i.e., $CL_{C1}$, $CL_{C2}$, etc.) of core portions 20 and central axis 15 are positioned along the same axis A. It is further noted that axis A is perpendicular to (or substantially perpendicular to) central axis 15. The centerline $CL_{Ci}$ of each core portion 20 defines the radial position r=0 for that core portion, such that the centerline is defined using Cartesian coordinates with central axis 15 defining the origin (0,0) of an x-y coordinate system coincident with the coordinate system defined by the radial coordinate r. The position of centerline $CL_{C1}$ for a first core portion 20 can be defined as $(x_1, y_1)$, and the position of centerline $CL_{C2}$ for a second core portion 20 can be defined as $(x_2, y_2)$.

As discussed above, fiber 10 may comprise a plurality of core portions 20, and core portions 20 may be arranged in a variety of arrangements, including linear and square configurations. In some embodiments, fiber 10 consists of only two core portions 20. In the embodiment of FIG. 1, core portions 20 are arranged in a 1×2 linear configuration such that both core portions 20 are disposed in a single row along the same axis A. More specifically, in the embodiment of FIG. 1, core portions 20 are arranged such that a centerline $CL_{C1}$, $CL_{C2}$ of each core portion 20 is positioned along axis A and such that central axis 15 of fiber 10 is also positioned on axis A. Therefore, central axis 15 of optical fiber 10 is aligned with the centerline $CL_{C1}$, $CL_{C2}$ of each core portion 20. However, it is also noted that core portions 20 may be arranged in other configurations and patterns. For example, in other embodiments, a centerline $CL_{C1}$ of a first core portion 20 may be offset from a centerline $CL_{C2}$ of a second core portion 20.

Each core portion 20 has a higher refractive index than common cladding 30 such that fiber 10 functions as a waveguide. In some embodiments, core portions 20 each lack a discernible boundary with common cladding 30. Alternatively, a distinct boundary is present between core portions 20 and common cladding 30.

Figure 2:
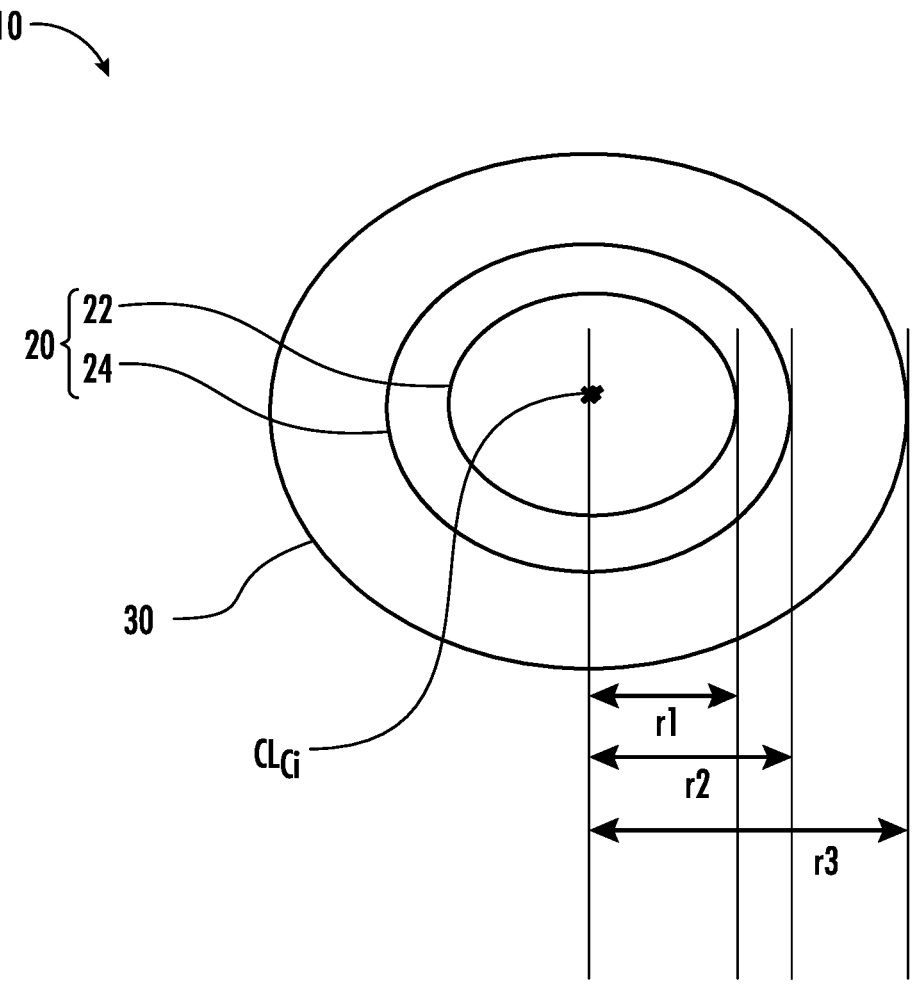
FIG. 2 is a schematic view of an enlarged cross-section of a single core of an uncoupled-core multicore optical fiber according to embodiments of the present disclosure.

As shown in FIG. 2, each core portion 20 comprises a core 22 and a depressed-index cladding 24 such that depressed-index cladding 24 surrounds core 22. Furthermore, depressed-index cladding 24 is immediately adjacent to core 22. Therefore, depressed-index cladding 24 directly contacts core 22 such that no other glass regions are disposed between depressed-index cladding 24 and core 22. Common cladding 30 surrounds depressed-index cladding 24 and is immediately adjacent to depressed-index cladding 24. Therefore, common cladding 30 directly contacts depressed-index cladding 24 such that no other glass regions are disposed between common cladding 30 and depressed-index cladding 24. Although FIG. 2 only depicts one core region 20, the other core regions 20 in fiber 10 may have the same structure. As discussed above, common cladding 30 is common to all core regions 20 and, thus, surrounds all of the core regions 20. Additional details for each core 22, depressed-index cladding 24, and common cladding 30 are provided below.

FIG. 3 is a plot of an idealized relative refractive index profile of fiber 10 as the relative refractive index Δ versus the radial coordinate r, according to embodiments of the present disclosure. Core 22 has relative refractive index $\Delta_1$, with a maximum refractive index of $\Delta_0=\Delta_{1MAX}$ at r=0 and a gradient α-profile, which is described in greater detail below. Depressed-index cladding 24 can be in the form of a depressed region or a trench and has a relative refractive index $\Delta_2$ and a radius $r_2$. Common cladding 30 has a radius $r_3$ and a relative refractive index $\Delta_3$. Furthermore, as shown by way of example, $\Delta_2<\Delta_1$, $\Delta_2<\Delta_3$, and $\Delta_3<\Delta_1$. Other configurations for the relative refractive index profile are discussed further below.

Core

Core 22 comprises silica glass that is either un-doped silica glass, up-doped silica glass, and/or down-doped silica glass. Up-doped silica glass includes silica glass doped with, for example, an alkali including potassium (e.g., $K_2O$), sodium ($Na_2O$), rubidium (e.g., $Rb_2O$), or a combination thereof. Other up-dopants include, for example, germanium (e.g., $GeO_2$), phosphorus (e.g., $P_2O_5$), aluminum (e.g., $Al_2O_3$), chlorine, or other alkali metal oxides (e.g. $Li_2O$, or $Cs_2O$). In some exemplary embodiments, core 22 is doped with both potassium and rubidium. In other exemplary embodiments, core 22 is doped with both sodium and potassium. In embodiments in which core 22 is doped with an alkali, the average concentration of alkali dopant in core 22 is defined as:

$$C_{alkali,avg} = \frac{8 \int_0^{MFD/2} C_{alkali}(r)rdr}{MFD}$$

where $C_{alkali}(r)$ is the concentration of the alkali dopant as a function of radial distance from the center of the core and MFD is the mode field diameter of the core at a wavelength of 1550 nm. In embodiments, the average concentration of alkali dopant in core 22 is in the range from 10 ppm to 500 ppm, or from 20 ppm to 500 ppm, or from 25 ppm to 400 ppm, or from 50 ppm to 300 ppm. Because core 22 has a maximum average alkali concentration of 500 ppm, the alkali dopant only slightly increases the refractive index of core 22. Therefore, core 22 is still able to effectively achieve a refractive index of about 0% even with such alkali up-doping. When core 22 includes two or more alkali dopants (such as both potassium and rubidium), the average concentration of alkali dopant is the sum of the average concentration of each of the individual alkali dopants. In some exemplary embodiments, the silica glass of core 22 is free of germanium and/or chlorine; that is core 22 comprises silica glass that lacks germanium and/or chlorine.

Down-doped silica glass includes silica glass doped with, for example, fluorine or boron.

As discussed above, the relative refractive index of each core 20 is described by an α-profile with an α value that is in a range of about 7.0 or less, or about 6.0 or less, or about 5.0 or less, or about 4.0 or less, or about 3.0 or less, or about 2.0 or less, or about 1.0 or less. In some other embodiments, the α value is about 8.0 or greater, or about 9.0 or greater, or about 10.0 or greater, or about 11.0 or greater, or about 12.0 or greater, or about 13.0 or greater. In some embodiments, the core α value is about 10, or about 12, or about 20. Therefore, core 20 can have either a graded-index profile or a step-index profile.

The outer radius $r_1$ of core 22 is in a range from about 2.5 microns to about 7.5 microns, or about 3.0 microns to about 7.0 microns, or about 3.5 microns to about 6.5 microns, or about 4.0 microns to about 5.0 microns, or about 3.0 microns to about 4.0 microns, or about 5.0 to about 6.5, or about 5.5 to about 6.3. In some embodiments, the outer radius $r_1$ is about 5.3 microns, or about 5.8 microns, or about 5.9 microns, or about 6.1 microns, or about 6.3 microns, or about 6.4 microns.

The maximum relative refractive index $\Delta_{1max}$ of core 22 is in a range from about −0.20% to about 0.20%, or in a range from about −0.15% to about 0.15%, or in a range from about −0.10% to about 0.10%, or in a range from about −0.05% to about 0.05%. In some embodiments, the relative refractive index $\Delta_{1max}$ is about 0.0%. The relative refractive index $\Delta_{1max}$ is preferably constant or approximately constant.

Although not depicted in FIG. 3, in some embodiments, the relative refractive index of core 22 may have a centerline dip such that the maximum refractive index of core 22 and the maximum refractive index of the entire fiber 10 is located a small distance away from the centerline of core 22 rather than at the centerline of core 22, as depicted in FIG. 3.

Depressed-Index Cladding

Depressed-index cladding 24 comprises down-doped silica glass. In some embodiments, depressed-index cladding region 34 is down-doped with fluorine or boron.

The inner radius of depressed-index cladding 24 is $r_1$, as discussed above. The outer radius $r_2$ of depressed-index cladding 24 is in a range from about 12.0 microns to about 28.0 microns, or about 14.0 microns to about 26.0 microns, or about 16.0 microns to about 24.0 microns, or about 18.0 microns to about 22.0 microns, or about 14.0 microns to about 22.0 microns, or about 15.0 microns to about 20.0 microns, or about 13.0 microns to about 23.0 microns. In some embodiments, the outer radius $r_2$ is about 16.5 microns, or about 16.8 microns, or about 18.4 microns, or about 20.0 microns, or about 21.3 microns, or about 22.1 microns.

The relative refractive index $\Delta_2$ of depressed-index cladding 24 is in a range from about −0.50% to about −0.2%, or in a range from about −0.40% to about −0.25%, or in a range from about −0.35% to about −0.25%, or in a range from about −0.30% to about −0.25%. In some embodiments, the relative refractive index $\Delta_2$ is about −0.27%, or about −0.29%, or about −0.31% or about −0.34% or about −0.37%. The relative refractive index $\Delta_2$ is preferably constant or approximately constant.

The refractive index $\Delta 2$ of depressed-index cladding 24 and the fluorine dopant used to achieve such refractive index is chosen to ensure that the optical fiber doesn't exhibit attenuation increase upon exposure to hydrogen. Attenuation at 850 nm is representative of the hydrogen sensitivity of an optical fiber. In some embodiments, the attenuation at 850 nm of fiber 10 is less than 1.6 dB/km. In other embodiments, the attenuation at 850 of fiber 10 nm is less than 1.5 dB/km.

As shown in FIG. 3, depressed-index cladding 24 is a depressed-index cladding region that forms a trench design. A "volume" $V_2$ of depressed-index cladding 24 is defined as:

$$V_2 = 2 \int_{r1}^{r2} \Delta_{2-3} r\, dr$$

where $\Delta_{2-3} = (\Delta_2(r) - \Delta_3)$.

The trench volume $V_2$ of depressed-index cladding 24 is about 5.0% Δ-micron$^2$ or greater, or about 7.0% Δ-micron$^2$ or greater, or about 10.0% Δ-micron$^2$ or greater, or about 15.0% Δ-micron$^2$ or greater, or about 17.5% Δ-micron$^2$ or greater, or about 20.0% Δ-micron$^2$ or greater, or about 22.5% Δ-micron$^2$ or greater, or about 25.0% Δ-micron$^2$ or greater, or about 27.5% Δ-micron$^2$ or greater, or about 30.0% Δ-micron$^2$ or greater, or about 32.5% Δ-micron$^2$ or greater, or about 35.0% Δ-micron$^2$ or greater. Additionally or alternatively, the trench volume $V_2$ of depressed-index cladding 24 is about 37.0% Δ-micron$^2$ or less, or about 36.0% Δ-micron$^2$ or less or about 34.0% Δ-micron$^2$ or less, or about 32.0% Δ-micron$^2$ or less, or about 30.0% Δ-micron$^2$ or less, or about 28.0% Δ-micron$^2$ or less, or about 26.0% Δ-micron$^2$ or less, or about 24.0% Δ-micron$^2$ or less, or about 22% Δ-micron$^2$ or less, or about 20.0% Δ-micron$^2$ or less, or about 18.0% Δ-micron$^2$ or less, or about 15.0% Δ-micron$^2$ or less, or about 10.0% Δ-micron$^2$ or less, or about 7.0% Δ-micron$^2$ or less. In embodiments, the trench volume $V_2$ of depressed-index cladding 24 is about 5.0% Δ-micron$^2$ to about 37.0% Δ-micron$^2$, or about 7.0% Δ-micron$^2$ to about 37.0% Δ-micron$^2$, or about 10.0% Δ-micron$^2$ to about 37.0% Δ-micron$^2$, or about 15.0% Δ-micron$^2$ to about 37.0% Δ-micron$^2$, or about 5.0% Δ-micron$^2$ to about 36.0% Δ-micron$^2$, or about 7.0% Δ-micron$^2$ to about 36.0% Δ-micron$^2$, or about 10.0% Δ-micron$^2$ to about 36.0% Δ-micron$^2$, or about 15.0% Δ-micron$^2$ to about 36.0% Δ-micron$^2$, or about 16.0% Δ-micron$^2$ to about 35.0% Δ-micron$^2$ or about 17.0% Δ-micron$^2$ to about 34.0% Δ-micron$^2$ or about 18.0% Δ-micron$^2$ to about 33.0% Δ-micron$^2$ or about 20.0% Δ-micron$^2$ to about 30.0% Δ-micron$^2$ or about 22.0% Δ-micron$^2$ to about 30.0% Δ-micron$^2$, or about 24.0% Δ-micron$^2$ to about 28.0% Δ-micron$^2$. The trench volume $V_2$ is at least 5.0% Δ-micron$^2$ in order to achieve the low cross talk values required for uncoupled multicore optical fibers. Furthermore, the trench volume $V_2$ is no more than 37.0% Δ-micron$^2$ in order to achieve cable cutoff values of 1530 nm or less (as discussed further below). In some embodiments, the trench volume $V_2$ is about 19.8% Δ-micron$^2$, or about 20.1% Δ-micron$^2$, or about 21.7% Δ-micron$^2$, or about 34.9% Δ-micron$^2$, or about 36.3% Δ-micron$^2$, or about 36.9% Δ-micron$^2$ FIG. 3 depicts depressed-index cladding 24 as having a rectangular shape. However, it is also contemplated that depressed-index cladding 24 may comprise other shapes, such as triangular.

The transition regions from core 22 to depressed-index cladding 24 and from depressed-index cladding 24 to common cladding 30 are shown as step changes in FIG. 3. However, it is to be understood that such step changes are an idealization and that the transition regions may not be strictly vertical in practice. Instead, the transition regions may have a slope or curvature.

Depressed-index cladding 24 helps to confine the light in each core 22 as it transmitted along optical fiber 10, thus reducing cross talk between adjacent core regions 20.

It is noted that one or more core regions 20 in fiber 10 may be different from one or more other core regions 20. For example, one or more core regions 20 may have a different refractive index profile and/or radius from one or more other cores regions 20. Furthermore, FIGS. 1 and 2 depict core regions 20 as being circular in cross-sectional shape. However, one or more core regions 20 may have other cross-sectional shapes, such as oval, rectangular, square, or D-shape.

Common Cladding

Common cladding 30 comprises down-doped silica glass. In some embodiments, common cladding 30 is down-doped with fluorine or boron. In yet other embodiments, common cladding 30 is comprised of un-doped silica glass.

The inner radius of common cladding 30 is $r_2$, as discussed above. The outer radius $r_3$ of common cladding 30 is in a range from about 40.0 microns to about 65 microns, or from about 45.0 microns to about 62.5 microns, or from about 50.0 microns to about 60.0 microns, or from about 52.5 microns to about 57.5 microns. In some embodiments, the outer radius $r_3$ of common cladding 30 is about 62.5 microns.

The relative refractive index $\Delta_3$ of common cladding is in a range from about −0.30% to about 0.00%, or in a range from about −0.25% to about −0.05%, or in a range from about −0.20% to about −0.10%, or in a range from about −0.15% to about 0.00%, or in a range from about −0.25% to about 0.00%. In some embodiments, the relative refractive index $\Delta_3$ is about −0.22%, or about −0.23, or about −0.25%. The relative refractive index $\Delta_3$ is preferably constant or approximately constant.

In some embodiments, an absolute difference between the relative refractive index $\Delta_2$ of depressed-index cladding 24 and the relative refractive index $\Delta_3$ of common cladding 30 is about 0.02% to about 0.30%, or about 0.03% to about 0.28%, or about 0.04% to about 0.25%, or about 0.05% to about 0.22%, or about 0.06% to about 0.20%, or about 0.08% to about 0.18%.

As discussed above, common cladding 30 may be an outer cladding that is common to all core regions 20 in fiber 10. Thus, common cladding 30 may surround each core region 20 in fiber 10.

Outer Coatings

Figure 4:
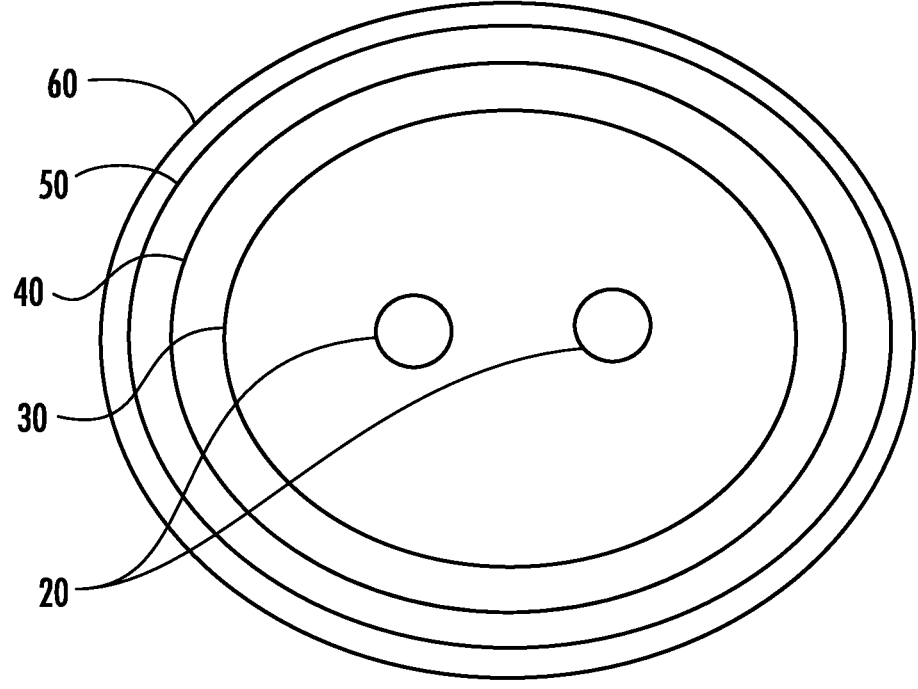
FIG. 4 is a schematic view of a cross-section of an uncoupled-core multicore optical fiber with outer coatings according to embodiments of the present disclosure.

One or more coatings may be disposed on an outer surface of common cladding 30. For example, as shown in FIG. 4, in some embodiments, a primary coating 40 immediately surrounds common cladding 30, and a secondary coating 50 immediately surrounds primary coating 40. Primary coating 40 may comprise a low modulus material and secondary coating 50 may comprise a high modulus material. One or more of the materials may be, for example, acrylate.

Optical fiber 10 may further include a tertiary coating 60 that surrounds secondary coating 50. Tertiary coating 60 may include pigments, inks, or other coloring agents to mark the optical fiber for identification purposes, and tertiary coating typically has a Young's modulus similar to the Young's modulus of secondary coating 50.

An outer diameter of secondary coating 50 is an outer diameter of fiber 10, when a tertiary layer is not applied. The outer diameter of secondary coating 50 may be about 250 microns or less, or about 220 microns or less, or about 210 microns or less, or about 200 microns or less, or about 190 microns or less, or about 180 microns or less, or about 170 microns or less.

Core Spacing

Figure 5:
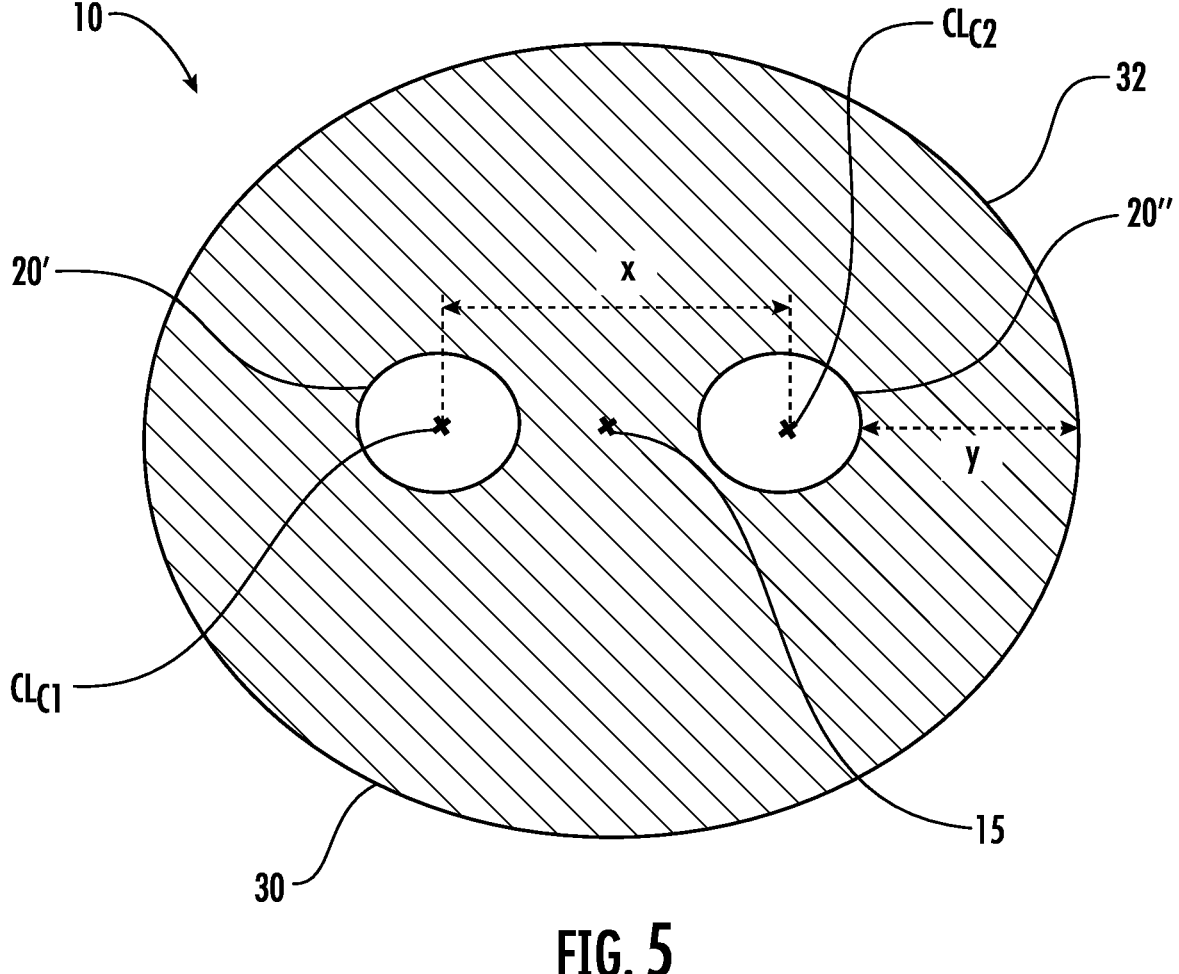
FIG. 5 is another schematic view of a cross-section of an uncoupled-core multicore optical fiber according to embodiments of the present disclosure.

As shown in FIG. 5, adjacent core regions 20 are spaced apart from each other a sufficient distance to reduce cross talk between the core regions. More specifically, a centerline $CL_{C1}$ of a first core 20' is spaced apart from a centerline $CL_{C2}$ of an adjacent second core 20" by distance x. Therefore, distance x is the center-to-center spacing between the centerline of adjacent cores. Using the Cartesian coordinates, as defined above, with the central axis 15 defining the origin (0,0) of an x-y coordinate system, the position of centerline $CL_{C1}$ being defined as $(x_1, y_1)$, and the position of centerline $CL_{C2}$ being defined as $(x_2, y_2)$, distance x is the minimum core-to-core separation distance (or "minimum separation distance") between the centerlines $CL_{C1}$ and $CL_{C2}$ and is defined as $x_2=\sqrt{[(x_2-x_1)^2+(y_2-y_1)^2]}$. As used herein, the term "adjacent core portion" is used to denote core portions having centerlines that are most proximate to one another (i.e., there is no other core portion having a centerline $CL_{Ci}$ that is more proximate to a core portion than an adjacent core portion). In embodiments, centerlines of adjacent core portions are separated by the minimum separation distance.

In embodiments, distance x is about 48 microns or greater, or about 50 microns or greater, or about 52 microns or greater, or about 55 microns or greater, or about 58 microns or greater. Additionally or alternatively, distance x is about 60 microns or less, or about 58 microns or less, or about 55 microns or less, or about 50 microns or less. In some embodiments, distance x is about 48 microns to about 60 microns, or about 50 microns to about 60 microns, or about 50 microns to about 58 microns, or about 50 microns to about 55 microns, or about 51 microns to about 54 microns.

As shown in FIG. 5, distance y is a minimum distance between the outer diameter of a core region 20 and the outer diameter of common cladding 30 and is measured from the edge of each of the plurality of core regions 20 to an outer surface 32 of common cladding 30. In embodiments, y is about 5 microns or greater, or about 10 microns or greater, or about 12 microns or greater, or 15 microns or greater, or about 18 microns or greater, or about 20 microns or greater, or about 22 microns or greater, or about 25 microns or greater, or about 28 microns or greater, or about 30 microns or greater. Additionally or alternatively, distance y is about 30 microns or less, or about 28 microns or less, or about 25 microns or less, or about 22 microns or less, or about 20 microns or less. In embodiments, distance y is about 5 microns to about 30 microns or about 10 microns to about 28 microns, or about 12 microns to about 25 microns, or about 15 microns to about 20 microns. Without intending to be bound by any particular theory, it is believed that the extent of signal loss due to tunneling and radiation is dependent upon distance y. More specifically, it is believed that an increase in distance y corresponds to an exponential increase in tunneling and radiation loss due to the increase in coupling of outer modes as distance y becomes larger. Therefore, in general, an increase in distance y corresponds to a reduction in radiation and tunneling losses.

Properties

Without intending to be limited by theory, the combination of depressed-index cladding 24 directly surrounding core 22 along with the core spacing (distance x) between adjacent cores provides low cable cutoff and low cross talk. Therefore, the optical fibers disclosed herein have superior bend performance and are suitable for use in submarine cables. Furthermore, because depressed-index cladding 24 directly surrounds core 22, the fibers disclosed herein do not include an inner cladding region between these components. Therefore, the fibers disclosed herein are able to be produced in a cost effective manner (by not requiring the additional time and resources needed to make such an inner cladding region).

In particular, the cable cutoff of the optical fibers produced herein is about 1530 nm or less, or about 1520 nm or less, or about 1515 nm or less, or about 1510 nm or less, or about 1500 nm or less, or about 1480 nm or less, or about 1450 nm or less, or about 1420 nm or less, or about 1400 nm or less, or about 1380 nm or less, or about 1350 nm or less, or about 1320 nm or less, or about 1300 nm or less, or about 1280 nm or less, or about 1250 nm or less. Additionally or alternatively, the cable cutoff is about 1250 nm or greater, or about 1280 nm or greater, or about 1300 nm or greater, or about 1320 nm or greater, or about 1350 nm or greater, or about 1380 nm or greater, or about 1400 nm or greater, or about 1420 nm or greater, or about 1450 nm or greater. In some embodiments, the cable cutoff is about 1300 nm to about 1530 nm, or about 1320 nm to about 1515 nm, or about 1350 nm to about 1500 nm, or about 1375 nm to about 1475 nm.

As discussed above, the cable cutoff of fibers 10 is preferably high in order to improve the bend performance of the fibers disclosed herein. It is also noted that the effective area of the fibers is relatively high (as discussed below), thus contributing to the higher cable cutoff.

The optical fibers disclosed herein have an effective area, at 1550 nm wavelength, of about 100 micron$^2$ or greater, or about 105 micron$^2$ or greater, or about 110 micron$^2$ or greater, or about 115 micron$^2$ or greater, or about 120 micron$^2$ or greater, or about 125 micron$^2$ or greater, or about 130 micron$^2$ or greater. Additionally or alternatively, the optical fibers have an effective area, at 1550 nm wavelength, of about 135 micron$^2$ or less, or about 130 micron$^2$ or less, or about 125 micron$^2$ or less, or about 120 micron$^2$ or less, or about 115 micron$^2$ or less. In embodiments, the effective area is about 100 micron$^2$ to about 135 micron$^2$, or about 105 micron$^2$ to about 130 micron$^2$, or about 110 micron$^2$ to about 125 micron$^2$, or about 115 micron$^2$ to about 120 micron$^2$. In some exemplary embodiments, the effective area is about 110 micron$^2$, or about 111 micron$^2$, or about 112 micron$^2$, or about 114 micron$^2$.

The co-propagating cross talk between adjacent cores in the optical fibers produced herein at a wavelength of 1550 nm is less than about −35 dB or less than about −40 dB per 100 km length of fiber and for a bend diameter of 140 mm. In embodiments, the co-propagating cross talk between adjacent cores at a wavelength of 1550 nm is less than about −45 dB, or less than about −50 dB, or less than about −60 dB, or less than about −65 dB, or less than about −70 dB, or less than about −75 dB, per 100 km length of fiber and for a bend diameter of 140 mm. Additionally or alternatively, in some embodiments, the co-propagating cross talk between adjacent cores at a wavelength of 1550 nm is greater than about −80 dB, or greater than about −75 dB, or greater than about −70 dB, or greater than about −65 dB, or greater than about −60 dB per 100 km length of fiber and for a bend diameter of 140 mm.

The counter-propagating cross talk between adjacent cores in the optical fibers produced herein at a wavelength of 1550 nm is less than about −70 dB, or less than about −69 dB, or less than about −68 dB, or less than about −67 dB, or less than about −66 dB, or less than about −65 dB, or less than about −64 dB, or less than about −63 dB, or less than about −63 dB, or less than about −62 dB, or less than about −61 dB, or less than about −60 dB, or less than about −55 dB, or less than about −53 dB, or less than about −50 dB, or less than about −47 dB, or less than about −45 dB, or less than about −43 dB, or less than about −40 dB, or less than about −37 dB, or less than about −35 dB, or less than about −33 dB, or less than about −30 dB per 100 km length of fiber and for a bend diameter of 140 mm. Additionally or alternatively, in some embodiments, the counter-propagating cross talk between adjacent cores at a wavelength of 1550 nm is greater than about −100 dB, or greater than about −95 dB, or greater than about −90 dB, or greater than about −85 dB, or greater than about −80 dB per 100 km length of fiber and for a bend diameter of 140 mm.

In addition to the low cable cutoff and low cross talk disclosed above, each core portion 20 disclosed herein has a mode field diameter, at 1550 nm wavelength, of about 11.0 microns or greater, or about 11.5 microns or greater, or about 12.0 microns or greater, or about 12.5 microns or greater, or about 13.0 microns or greater, or about 13.5 microns or greater, or about 14.0 microns or greater, or about 14.5 microns or greater, or about 15.0 microns or greater. Additionally or alternatively, each core portion 20 has a mode field diameter, at 1550 nm wavelength, of about 15.0 microns or less, or about 14.5 microns or less, or about 14.0 microns or less, or about 13.5 microns or less, or about 13.0 microns or less, or about 12.5 microns or less, or about 12.0 microns or less, or about 11.5 microns or less. In some embodiments, each core portion 20 has a mode field diameter, at 1550 nm wavelength, from about 11.0 microns to about 15.0 microns, or about 11.5 microns to about 14.5 microns, or about 12.0 microns to about 14.0 microns, or about 12.5 microns to about 13.5 microns. In exemplary embodiments, the mode field diameter is about 11.5 microns, or about 12.0 microns, or about 12.5 microns, or about 13.0 microns.

According to aspects of the present disclosure, each core portion 20 has a dispersion at 1550 nm of less than about 22 ps/nm/km. For example, the dispersion at 1550 nm is from about 17 ps/nm/km to about 22 ps/nm/km, or about 18 ps/nm/km to about 22 ps/nm/km, or about 18 ps/nm/km to about 21 ps/nm/km, or about 19 ps/nm/km to about 21 ps/nm/km, or about 20 ps/nm/km to about 22 ps/nm/km.

Each core portion 20 has a dispersion slope at 1550 nm of less than about 0.1 ps/nm$^2$/km, or about 0.04 ps/nm$^2$/km to about 0.1 ps/nm$^2$/km, or about 0.05 ps/nm$^2$/km to about 0.1 ps/nm$^2$/km, or about 0.055 ps/nm$^2$/km to about 0.1 ps/nm$^2$/km, or about 0.06 ps/nm$^2$/km to about 0.1 ps/nm$^2$/km, or about 0.08 ps/nm$^2$/km to about 0.1 ps/nm$^2$/km, or about 0.04 ps/nm$^2$/km to about 0.08 ps/nm$^2$/km, or about 0.05 ps/nm$^2$/km to about 0.08 ps/nm$^2$/km, or about 0.055 ps/nm$^2$/km to about 0.08 ps/nm$^2$/km, or about 0.06 ps/nm$^2$/km to about 0.08 ps/nm$^2$/km, or about 0.04 ps/nm$^2$/km to about 0.06 ps/nm$^2$/km, or about 0.05 ps/nm$^2$/km to about 0.06 ps/nm$^2$/km, or about 0.055 ps/nm$^2$/km to about 0.06 ps/nm$^2$/km. For example, the dispersion slope at 1550 nm can be about 0.04 ps/nm$^2$/km, about 0.05 ps/nm$^2$/km, about 0.055 ps/nm$^2$/km, about 0.057 ps/nm$^2$/km, about 0.058 ps/nm$^2$/km, about 0.059 ps/nm$^2$/km, about 0.06 ps/nm$^2$/km, about 0.061 ps/nm$^2$/km, about 0.07 ps/nm$^2$/km, about 0.08 ps/nm$^2$/km, or any value between these values.

Each core portion 20 may have the same or different dispersion and dispersion slope at 1550 nm.

The average attenuation of the optical fibers disclosed herein is determined by measuring the attenuation for each core portion 20 of uncoupled-core multicore optical fiber 10 at a wavelength of 1550 nm and then calculating an average attenuation for the entire uncoupled-core multicore optical fiber 10 based on the individual attenuation measurements of each core portion 20. In embodiments, the average attenuation at a wavelength of 1550 nm of uncoupled-core multicore optical fiber 10 is less than about 0.165 dB/km, or less than about 0.160 dB/km, or less than about 0.155 dB/km, or less than about 0.150 dB/km, or less than about 0.149 dB/km, or less than about 0.145 dB/km, or less than about 0.140 dB/km, or less than about 0.135 dB/km, or less than about 0.130 dB/km. Furthermore, the average attenuation at a wavelength of 1850 nm of uncoupled-core multicore optical fiber 10 is less than about 1.6 dB/km, or less than about 1.5 dB/km (as also discussed above). It should be understood that the average attenuation of uncoupled-core multicore optical fiber 110 may be within a range formed from any one of the lower bounds for attenuation and any one of the upper bounds of attenuation described herein.

The individual attenuation of each core portion 20 is also determined, which is about less than about 0.165 dB/km, or less than about 0.160 dB/km, or less than about 0.155 dB/km, or less than about 0.150 dB/km, or less than about 0.149 dB/km, or less than about 0.145 dB/km, or less than about 0.140 dB/km, or less than about 0.135 dB/km, or less than about 0.130 dB/km, at a wavelength of 1550 nm. In embodiments, the attenuation of a first core portion 20 in uncoupled-core multicore optical fiber 10 is about 0.148 dB/km and the attenuation of a second portion 20 in uncoupled-core multicore optical fiber 10 is about 0.147 dB/km Additionally, the average attenuation of the uncoupled optical fibers disclosed herein is less than or equal to about 1.6 dB/km at 850 nm wavelength, less than or equal to about 1.5 dB/km at 850 nm wavelength, or less than or equal to about 0.145 dB/turn at 850 nm wavelength.

The radiation loss of core portions 20 at a wavelength of 1550 nm is about 0.020 dB/km or less, or about 0.010 dB/km or less, or about 0.005 dB/km or less, or about 0.003 dB/km or less.

In embodiments, the multicore fibers disclosed have a bend loss at 1625 nm for 100 turns at 60 mm mandrel diameter of about 0.6 dB or less, or about 0.5 dB or less, or about 0.4 dB or less.

Referring again to FIGS. 2 and 3, in embodiments, each core portion 20 is fabricated such that the varying relative refractive index $\Delta_2$ of depressed-index cladding region 24 is determined by a down-dopant concentration D that varies with radial coordinate r, i.e., D=D(r). In embodiments, the down-dopant is fluorine and D(r) is expressed as a radially-dependent fluorine concentration F(r). As such, F(r) within depressed-index cladding 24 may vary between a minimum value $F_{min}$ and a maximum value $F_{max}$. In embodiments, $F_{min}$ is at the radial position $r_1$ and $F_{max}$ is at the radial position $r_2$. In embodiments, $F_{max}$ is greater than or equal to 0.75 wt. % and less than or equal to 2.2 wt. %, or greater than or equal to 0.9 wt. % and less than or equal to 2.2 wt. %.

The values of the down-dopant concentrations (e.g., $F_{max}$ and $F_{min}$) within depressed-index cladding 24 determine the refractive index profile therein, and therefore the trench volume $V_2$ of depressed-index cladding 24. Without wishing to be bound by theory, it is believed that the trench volume $V_2$ influences the cable cutoff wavelength, effective area, dispersion, bend loss, and inter-core crosstalk of each of the core portions 20. To achieve an effective area of between 100 $micron^2$ and 135 $micron^2$ at a wavelength of 1550 nm, a cable cutoff wavelength of less than 1530 nm, a dispersion at a wavelength of 1550 nm of less than 22 ps/nm/km, and crosstalk at a wavelength of 1550 nm of less than −30 dB/100 km, the trench volume $V_2$ of depressed-index cladding 24 of each core portion 20 should be greater than or equal to 15% $\Delta$-$micron^2$ and less than or equal to 37% $\Delta$-$micron^2$.

Exemplary Embodiments

Provided below are exemplary embodiments of the uncoupled-core multicore optical fibers disclosed herein. The below exemplary embodiments are intended to be exemplary and are not intended to limit the scope of the disclosure.

Table 1 below provides five modeled examples (Exemplary Examples A-F) of uncoupled-core multicore optical fibers in which each fiber comprises 2 cores are arranged in a 1×2 linear configuration. The core refractive index, radius, and alpha values in Table 1 apply to both cores for each exemplary optical fiber. The optical fibers in Table 1 below each have an outer diameter of 125 microns. Furthermore, the cross talk at 1550 nm of each optical fiber in Table 1 was determined at different center-to-center spacing lengths between the centerline of adjacent core portions (i.e., different distances for x). More specifically, the cross talk at 1550 nm was determined for each optical fiber with a center-to-center spacing of adjacent core portions ranging from 44 microns to 66 microns.

TABLE 1

| | Exemplary Example A | Exemplary Example B | Exemplary Example C | Exemplary Example D | Exemplary Example E |
|---|---|---|---|---|---|
| Multicore Design | 1 × 2 | 1 × 2 | 1 × 2 | 1 × 2 | 1 × 2 |
| Core Maximum Relative Refractive Index, $\Delta_{1MAX}$ (%) | 0 | 0 | 0 | 0 | 0 |
| Core Radius, $r_1$, (microns) | 5.75 | 6.1 | 6.3 | 6.1 | 5.4 |
| Core Alpha | 20 | 20 | 20 | 20 | 20 |
| Depressed-Index Cladding Relative Refractive Index, $\Delta_{2MIN}$ (%) | −0.292 | −0.33 | −0.37 | −0.33 | −0.267 |
| Depressed-Index Cladding Radius, $r_2$ (microns) | 21.29 | 16.5 | 16.5 | 20 | 16 |
| Depressed-Index Cladding Shape | Rectangular | Rectangular | Rectangular | Rectangular | Rectangular |
| Volume of Depressed-Index Cladding, $V_2$ (% $\Delta$ $micron^2$) | 19.75 | 20.9 | 34.88 | 36.27 | 4.99 |
| Common Cladding Relative Refractive Index, $\Delta_3$ (%) | −0.245 | −0.245 | −0.22 | −0.23 | −0.245 |
| Cable Cutoff (nm) | 1342 | 1428 | 1437 | 1427 | 1362 |
| Mode Field Diameter at 1550 nm (micron) | 11.79 | 11.66 | 11.53 | 11.67 | 11.93 |
| Effective Area at 1550 nm ($micron^2$) | 110.03 | 110.23 | 109.85 | 110.49 | 110.32 |
| Dispersion at 1550 nm (ps/nm/km) | 19.95 | 20.9 | 21.6 | 20.978 | 18.88 |

TABLE 1-continued

| Center-to-Center Spacing Between Centerline of Adjacent Core Portions (microns) | Co-Propagating Crosstalk at 1550 nm per 100 km Length of Fiber (dB) at Bend Diameter of 140 mm | | | | |
|---|---|---|---|---|---|
| 44 | −24.8 | −28 | −32.58 | −33.29 | −13.69 |
| 46 | −30.32 | −33.71 | −37.92 | −38.72 | −19 |
| 48 | −35.83 | −39.38 | −43.26 | −44.14 | −24.32 |
| 50 | −41.32 | −45.05 | −48.57 | −49.54 | −29.62 |
| 52 | −46.8 | −50.7 | −53.88 | −54.93 | −34.91 |
| 54 | −52.2 | −56.33 | −59.17 | −60.31 | −40.19 |
| 56 | −57.72 | −61.96 | −64.45 | −65.67 | −45.45 |
| 58 | −63.16 | −67.58 | −69.72 | −71.03 | −50.7 |
| 60 | −68.59 | −73.18 | −74.98 | −76.38 | −55.95 |

| Center-to-Center Spacing Between Centerline of Adjacent Core Portions (microns) | Counter-Propagating Crosstalk at 1550 nm per 100 km Length of Fiber (dB) at Bend Diameter of 140 mm | | | | |
|---|---|---|---|---|---|
| 44 | −46.67 | −50.49 | −55.27 | −56.23 | −29.50 |
| 46 | −53.08 | −56.67 | −60.99 | −61.8 | −38.53 |
| 48 | −58.86 | −62.47 | −66.38 | −67.27 | −46.06 |
| 50 | −64.43 | −68.18 | −71.41 | −72.68 | −52.30 |
| 52 | −69.94 | −73.21 | −77.02 | −78.07 | −57.92 |
| 54 | −75.34 | −79.47 | −82.31 | −83.49 | −63.28 |
| 56 | −80.86 | −85.1 | −87.59 | −88.81 | −68.58 |
| 58 | −86.3 | −90.72 | −92.86 | −94.17 | −73.84 |
| 60 | −91.3 | −96.32 | −98.12 | −99.52 | −79.09 |

As shown in Table 1 above, a center-to-center spacing between the centerline of adjacent core portions of 48 microns and above overall produced better cross talk between the adjacent cores.

A manufactured optical fiber was produced based upon the modeled Exemplary Example A above. The properties of this manufactured optical fiber are shown below in Table 2 as Exemplary Example A'. Additionally, a manufactured optical fiber was produced based upon the modeled Exemplary Example E above. The properties of this manufactured optical fiber are shown below in Table 2 as Exemplary Example E'. Both Exemplary Examples A' and E' have a center-to-center spacing between the centerline of adjacent core portions of 50 microns.

spacing of adjacent core portions (in microns). The counter-propagating inter-core crosstalk (in dB/100 km), at a wavelength of 1550 nm, of Exemplary Examples A-D is plotted in FIG. 7B as a function of the center-to-center spacing of adjacent core portions (in microns). And the radiation loss (dB/km) of Exemplary Examples A-D is plotted in FIG. 8 as a function of the center-to-center spacing of adjacent core portions (in microns). The radiation loss, as discussed herein, represents mode leakage loss due to a smaller cladding diameter and overlap of mode field intensity with high index primary coating. The center-to-center spacing of adjacent core portions is chosen such that the inter-core crosstalk, at a wavelength of 1550 nm, is less than −30

TABLE 2

| | | | | | Counter- | | | |
|---|---|---|---|---|---|---|---|---|
| | | Attenuation at 1310 nm (dB/km) | Attenuation at 1550 nm (dB/km) | Attenuation at 1625 nm (dB/km) | Mode Field Diameter at 1550 nm (microns) | Dispersion at 1550 nm (ps/nm/km) | Dispersion Slope at 1550 nm (ps/nm²/km) | Co-propagating Cross Talk (dbB/km) | Counter-propagating Cross Talk (dbB/km) |
| Exemplary Example A' | Core 1 | 0.268 | 0.148 | 0.164 | 12.35 | 20.8 | 0.06 | −59 | −89.5 |
| | Core 2 | 0.263 | 0.144 | 0.161 | | | | (−39 per 100 km) | (−69.5 per 100 km) |
| Exemplary Example E' | Core 1 | 0.256 | 0.148 | 0.168 | 12.15 | 20.1 | 0.06 | −54 | −85.5 |
| | Core 2 | 0.258 | 0.147 | 0.167 | | | | (−34 per 100 km) | (−65.5 per 100 km) |

As shown in Table 2 above, the manufactured optical fibers of both Exemplary Examples A' and E' have very low attenuation while still achieving a high mode field diameter and low cross talk.

Figure 6A:
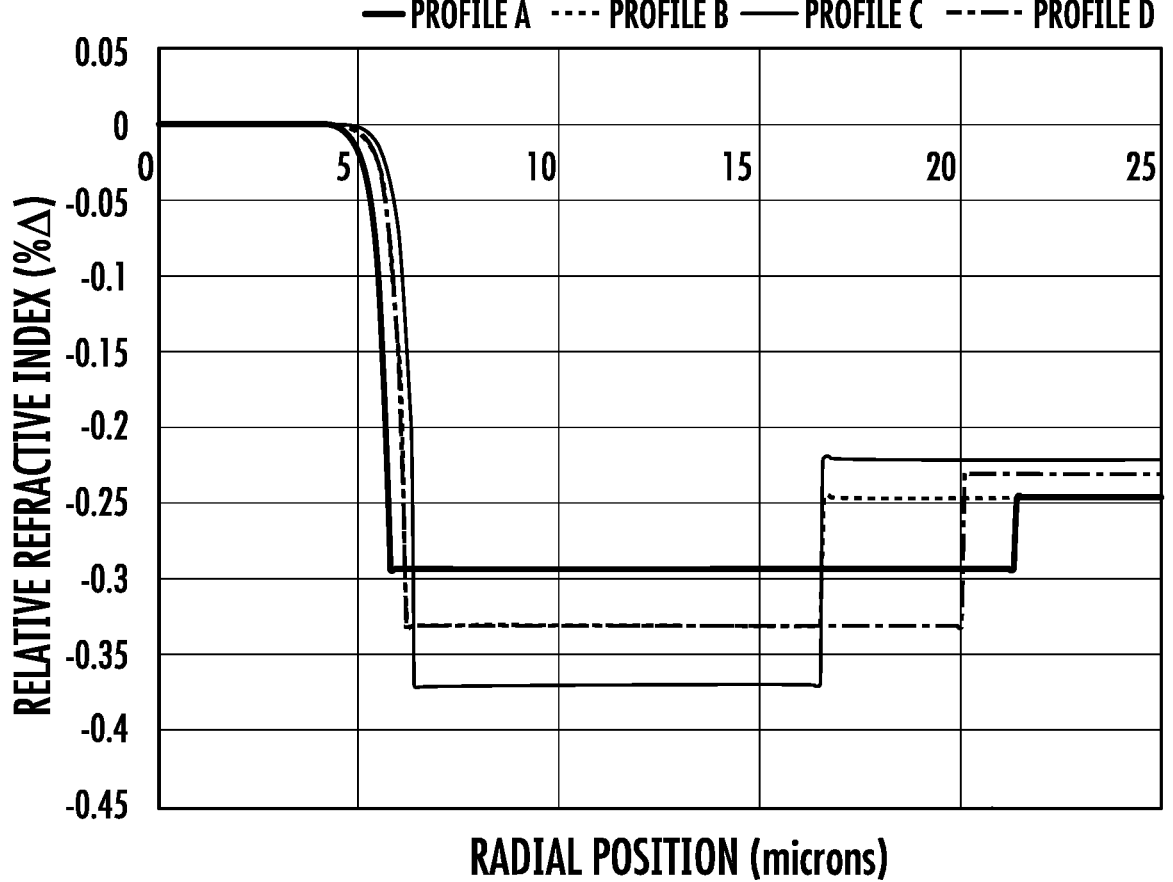
FIG. 6A depicts relative refractive index profiles of exemplary uncoupled-core multicore optical fibers according to embodiments of the present disclosure.
Figure 6B:
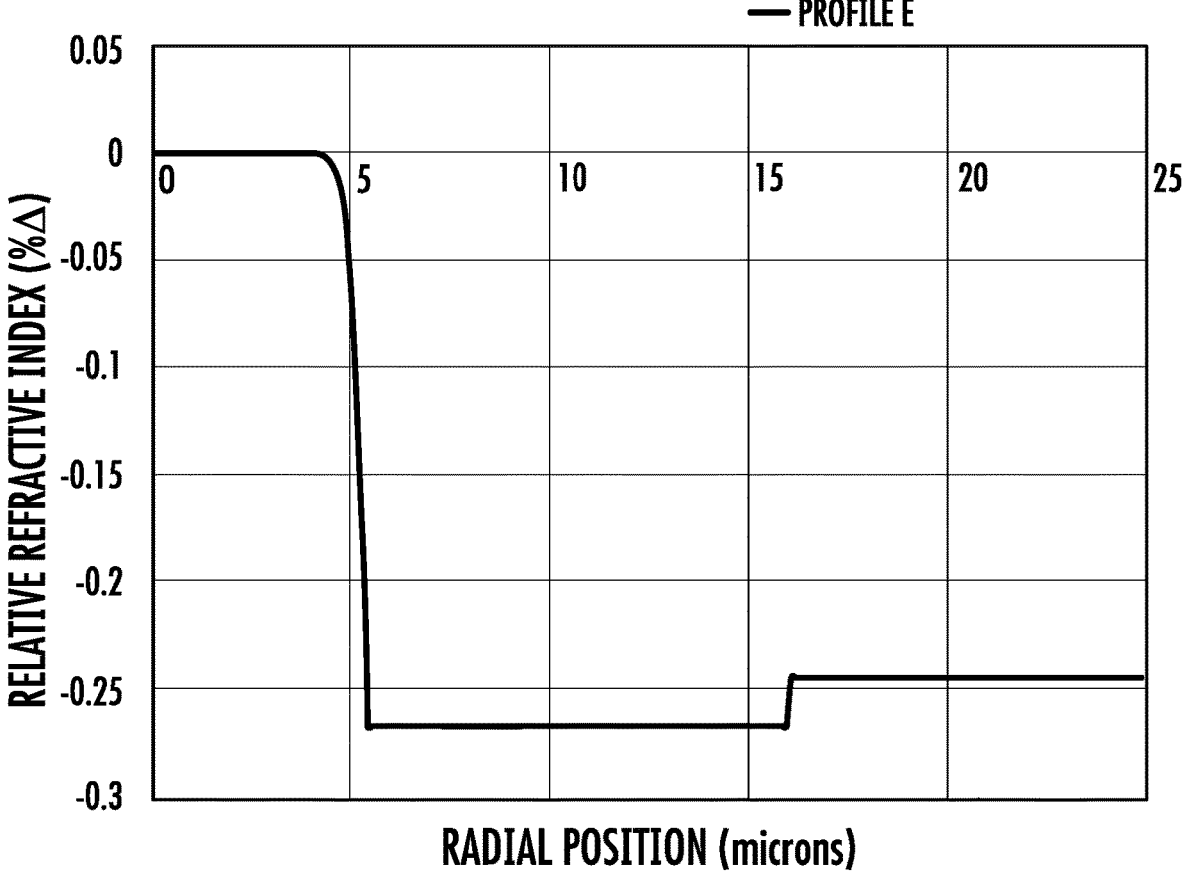
FIG. 6B depicts a relative refractive index profile of an exemplary uncoupled-core multicore optical fiber according to embodiments of the present disclosure.
Figure 7A:
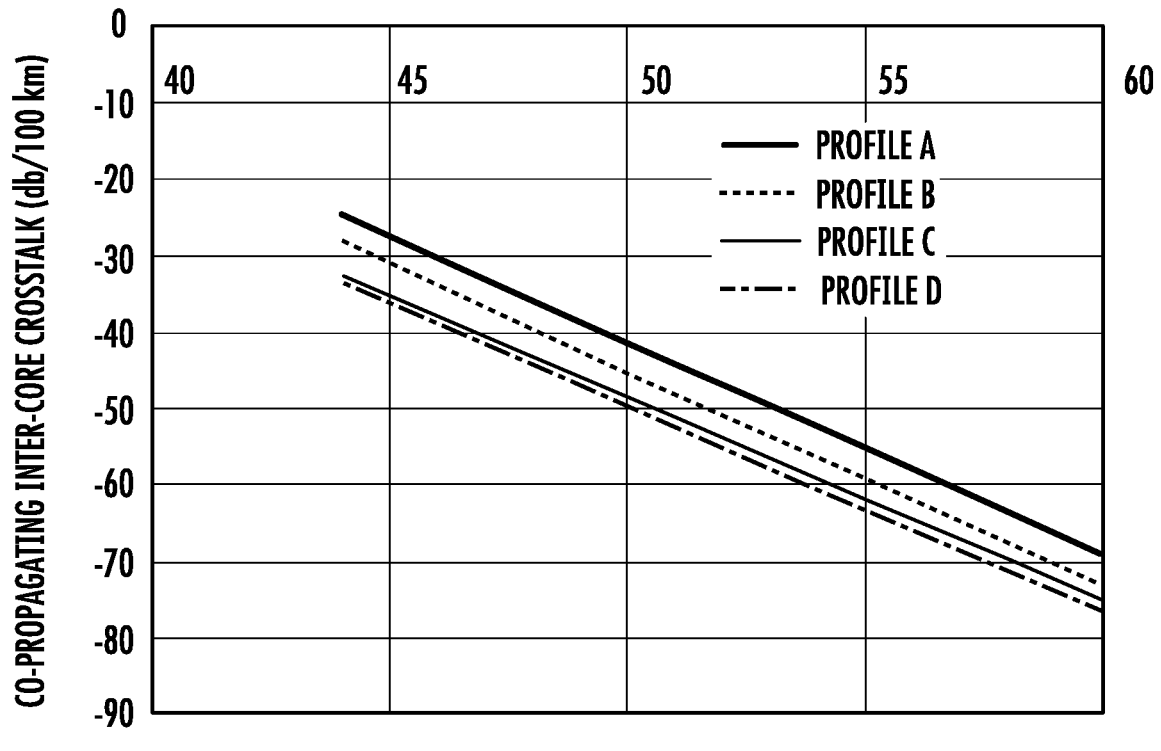
FIG. 7A is a plot of co-propagating inter-core cross talk vs. center-to-center spacing of adjacent cores of uncoupled-core multicore optical fibers according to embodiments of the present disclosure.
Figure 7B:
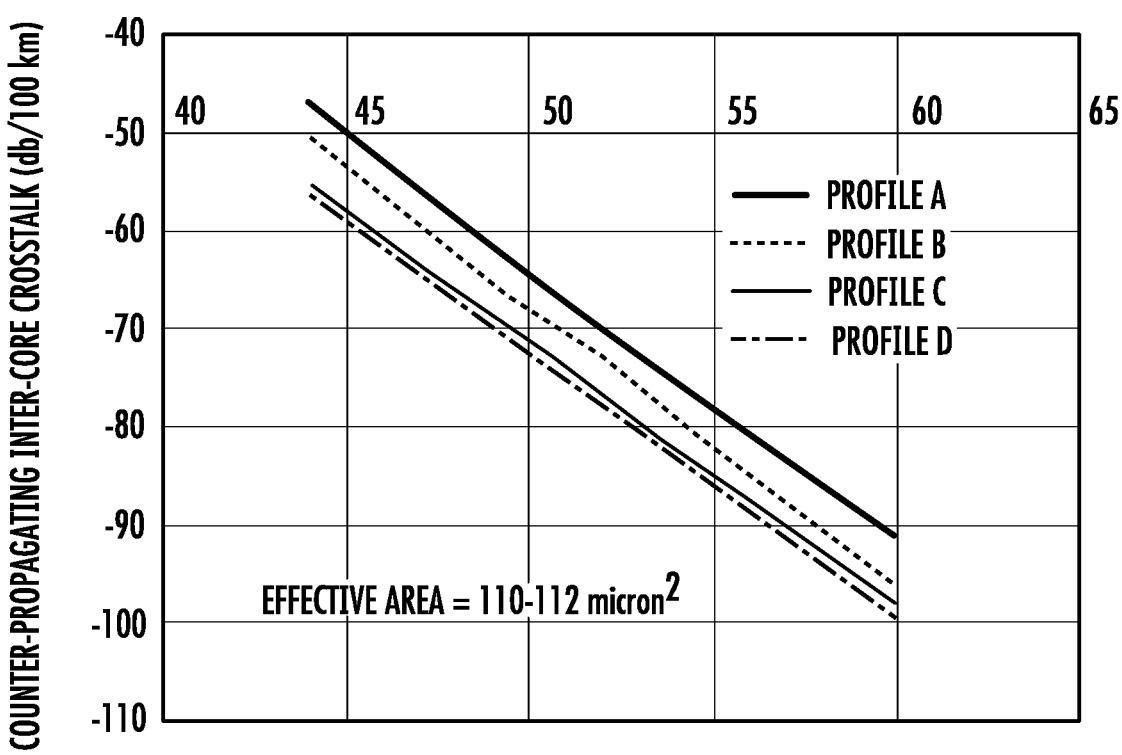
FIG. 7B is a plot of counter-propagating inter-core cross talk vs. center-to-center spacing of adjacent cores of uncoupled-core multicore optical fibers according to embodiments of the present disclosure.
Figure 8:
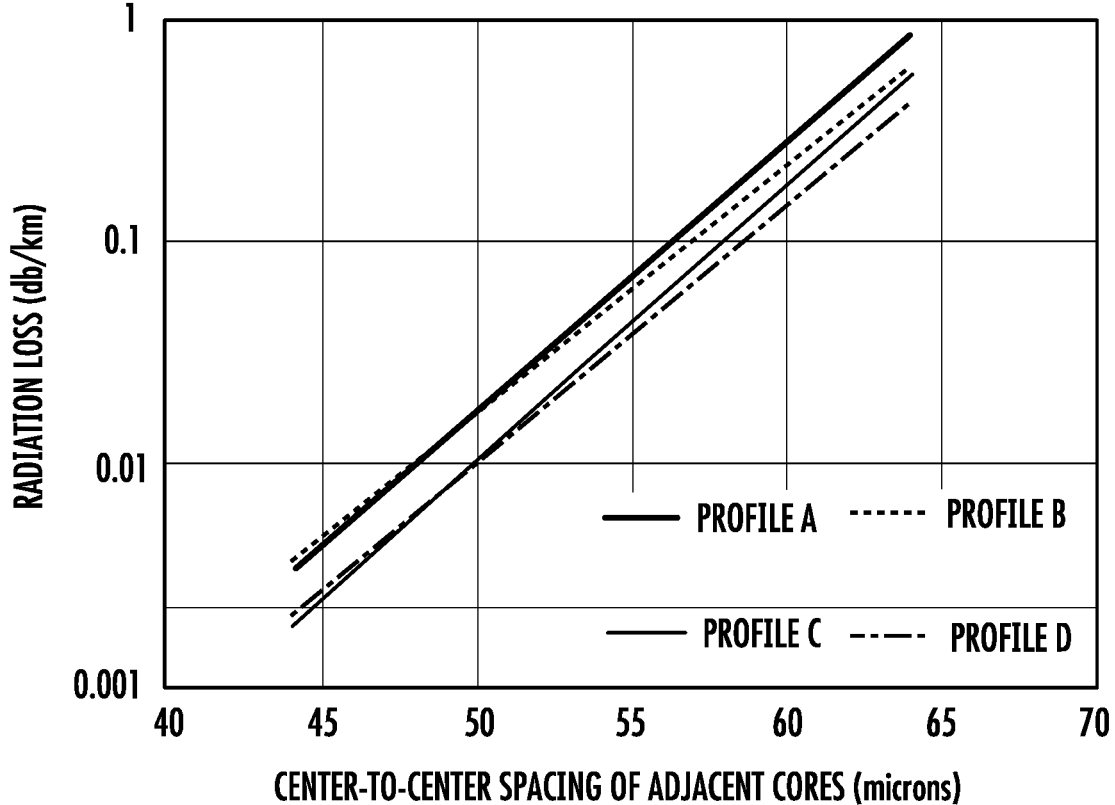
FIG. 8 is a plot of radiation loss vs. center-to-center spacing of adjacent cores of uncoupled-core multicore optical fibers according to embodiments of the present disclosure.

FIG. 6A shows the refractive index profiles of Exemplary Examples A-D versus the radial coordinate r. Furthermore, the co-propagating inter-core crosstalk (in dB/100 km), at a wavelength of 1550 nm, of Exemplary Examples A-D is plotted in FIG. 7A as a function of the center-to-center dB/100 km and that the radiation loss is less than 1 dB/km. Furthermore, FIG. 7 shows that as the center-to-center spacing of adjacent core portions increases, the inter-core crosstalk between the adjacent core portions decreases. However, FIG. 8 shows that as the center-to-center spacing of adjacent cores increases, the radiation loss also increases. Therefore, as distance x increases, the crosstalk between cores decreases but radiation loss increases.

Exemplary Process

The uncoupled-core multicore optical fibers of the present disclosure can be made using any suitable method for forming a multicore optical fiber. See, for example, U.S. Pat. No. 11,370,689 B2, the entire content of which is incorporated herein by reference. An exemplary method that is used to form the uncoupled-core multicore optical fiber 10 (or any of the alternative embodiments thereof) described herein with respect to FIGS. 1-8 includes forming a glass blank for common cladding 30. Formation of the glass blank may involve first forming a soot body via an outside vapor deposition ("OVD") process, a soot pressing method, a vapor axial deposition ("VAD") process, or any other known method and then dehydrated and consolidated to fully densified glass. The soot body may be formed of a glass precursor material. In embodiments, the soot body is formed of silica-based material Multiple holes are then drilled along the length of the glass blanks for the core canes to be inserted in them. In some embodiments, the common cladding glass blank is doped with a down dopant such as fluorine.

Next, a core region of a core cane may be formed. In some embodiments, the core region is comprised of at least one alkali in concentration between 0.1 wt % and 5 wt %. In some embodiments, the core is doped with potassium. In other embodiments, the core is doped with two alkali components selected from the group comprising potassium, sodium, rubidium, and cesium. The core cane may be formed by methods disclosed in U.S. Pat. No. 7,536,076 B2, the entire content of which is incorporated herein by reference.

Next, a clad layer is deposited on the core region. In embodiments, soot overclad layer(s) of silica-based soot is formed on the core region via an OVD or VAD process. The overclad layer(s) has a composition corresponding to the depressed-index cladding of the core portion of the multicore optical fiber. For example, the overlayers may include separate layers having a composition corresponding to depressed-index cladding 24. The overcladded core region is positioned within a consolidation furnace and consolidation of the overcladded core region is initiated. For example, the overcladded core region may be heated to a peak sintering temperature to initiate consolidation.

During the consolidation, the overcladded core region is exposed to a down-dopant for a period T after initiation of the consolidation. A soot preform resulting from the completion of the consolidation process includes a core region and an overcladding layer surrounding the core region. The core region (e.g., in an unconsolidated or partially consolidated state) and overcladding layer may be placed in an interior of a consolidation furnace. The consolidation furnace may be heated to a peak sintering temperature of the overcladding layer to initiate consolidation.

A gas source is in fluid communication with the interior of the consolidation furnace provides a gas containing a down-dopant into the interior. The down-dopant (e.g., fluorine) then diffuses through the overcladding layer during consolidation. In embodiments, the rate of diffusion of the down-dopant through the overcladding layer is dependent on the compositional and material properties of the overcladding layer (e.g., porosity, density, etc.). As the overcladding layer is consolidated, the porosity of the overcladding layer is diminished such that a rate of diffusion of the down-dopant may decrease as the overcladding layer consolidates.

In embodiments, a region of the core portion encircling and directly contacting the core corresponds to the depressed-index cladding 24. In embodiments, depressed-index cladding 24 possess a concentration of the down-dopant.

After the core region is consolidated into a glass preform, the glass preform is inserted into the holes drilled into the glass blank formed during the step. After each core cane is inserted into the glass blank, the fiber preform is assembled by thermally closing the gap between the inserted cane and the drilled hole. The assembled preform is then drawn into a multicore optical fiber. Example methods of forming a cane-based optical fiber preform are discussed in U.S. Pat. No. 11,370,689, the entire content of which is incorporated by reference herein.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An uncoupled-core multicore optical fiber comprising:
at least two core portions, each core portion comprising:
a core having a radius $r_1$ and a relative refractive index $\Delta_1$ relative to pure silica, the core being doped with at least one of sodium, potassium, and rubidium; and
a depressed-index cladding having a radius $r_2$ and a relative refractive index $\Delta_2$ relative to pure silica such that $\Delta_2<\Delta_1$, the depressed-index cladding surrounding and directly contacting the core, a volume $V_2$ of the depressed-index cladding being about 5.0% $\Delta$-micron$^2$ to about 37.0% $\Delta$-micron$^2$; and
a common cladding having a radius $r_3$ and a relative refractive index $\Delta_3$ relative to pure silica such that $\Delta_2<\Delta_3<\Delta_1$, the common cladding surrounding and directly contacting the depressed-index cladding,
wherein:
a cable cutoff wavelength of each core portion is about 1530 nm or less,
an effective area of each core portion is about 100 micron$^2$ to about 135 micron$^2$ at a wavelength of 1550 nm,
each core portion comprises an attenuation at a wavelength of 1550 nm of about 0.165 dB/km or less,
a center-to-center spacing between centerlines of adjacent core portions is about 48 microns to about 60 microns,
co-propagating cross talk between the at least two core portions is about −40 dB or less per 100 km of optical fiber for a bend diameter of 140 mm, and
counter-propagating cross talk between the at least two core portions is about −45 dB or less per 100 km of optical fiber.

2. The uncoupled-core multicore optical fiber of claim 1, wherein co-propagating cross talk between the at least two core portions is about −50 dB or less per 100 km of optical fiber for a bend diameter of 140 mm.

3. The uncoupled-core multicore optical fiber of claim 2, wherein co-propagating cross talk between the at least two core portions is about −60 dB or less per 100 km of optical fiber.

4. The uncoupled-core multicore optical fiber of claim 1, wherein the at least two core portions consists of only two core portions.

5. The uncoupled-core multicore optical fiber of claim 1, wherein the centerline of each of the at least two core portions is positioned along an axis A.

6. The uncoupled-core multicore optical fiber of claim 5, wherein the axis A extends through a central axis of the multicore optical fiber.

7. The uncoupled-core multicore optical fiber of claim 1, wherein the effective area of each core portion is about 110 $micron^2$ to about 130 $micron^2$ at a wavelength of 1550 nm.

8. The uncoupled-core multicore optical fiber of claim 1, wherein the attenuation of each core portion at a wavelength of 1550 nm is about 0.160 dB/km or less.

9. The uncoupled-core multicore optical fiber of claim 1, wherein the relative refractive index $\Delta_1$ is about −0.20% to about 0.20%.

10. The uncoupled-core multicore optical fiber of claim 1, wherein an average concentration of alkali in the core is about 20 ppm to about 500 ppm.

11. The uncoupled-core multicore optical fiber of claim 10, wherein the average concentration of alkali in the core is about 5 ppm to about 300 ppm.

12. The uncoupled-core multicore optical fiber of claim 1, wherein each core portion has a dispersion at 1550 nm of less than about 22 ps/nm/km.

13. The uncoupled-core multicore optical fiber of claim 1, wherein each core portion has a dispersion at 1550 nm of less than about 21 ps/nm/km.

14. An uncoupled-core multicore optical fiber comprising:
at least two core portions, each core portion comprising:
a core having a radius $r_1$ and a relative refractive index $\Delta_1$ relative to pure silica,
wherein each portion comprises an attenuation at a wavelength of 1550 nm of less than about 0.150 dB/km,
wherein co-propagating cross talk between the at least two core portions is about −40 dB or less per 100 km of optical fiber for a bend diameter of 140 mm, and wherein counter-propagating cross talk between the at least two core portions is about −45 dB or less per 100 km of optical fiber.

15. The uncoupled-core multicore optical fiber of claim 14, wherein:
the core is doped with at least one of sodium, potassium, and rubidium,
the optical fiber further comprises:
a depressed-index cladding having a radius $r_2$ and a relative refractive index $\Delta_2$ relative to pure silica such that $\Delta_2 < \Delta_1$, the depressed-index cladding surrounding and directly contacting the core, a volume $V_2$ of the depressed-index cladding being about 5.0% $\Delta$-$micron^2$ to about 37.0% $\Delta$-$micron^2$, and
a common cladding having a radius $r_3$ and a relative refractive index $\Delta_3$ relative to pure silica such that $\Delta_2 < \Delta_3 < \Delta_1$, the common cladding surrounding and directly contacting the depressed-index cladding,
a cable cutoff wavelength of each core portion is about 1530 nm or less,
an effective area of each core portion is about 100 $micron^2$ to about 135 $micron^2$ at a wavelength of 1550 nm, and
a center-to-center spacing between centerlines of adjacent core portions is about 48 microns to about 60 microns.

16. The uncoupled-core multicore optical fiber of claim 14, wherein co-propagating cross talk between the at least two core portions is about −50 dB or less per 100 km of optical fiber for a bend diameter of 140 mm.

17. The uncoupled-core multicore optical fiber of claim 14, wherein counter-propagating cross talk between the at least two core portions is about −50 dB or less per 100 km of optical fiber.

* * * * *